(12) United States Patent
Lu et al.

(10) Patent No.: US 12,298,186 B2
(45) Date of Patent: May 13, 2025

(54) SYSTEMS AND METHODS FOR PROCESSING INFRARED DATA

(71) Applicant: ZHEJIANG PIXFRA TECHNOLOGY CO., LTD., Zhejiang (CN)

(72) Inventors: Wuping Lu, Hangzhou (CN); Zhiqiang Yang, Hangzhou (CN); Jie Zhan, Hangzhou (CN); Zhigang Yuan, Hangzhou (CN)

(73) Assignee: ZHEJIANG PIXFRA TECHNOLOGY CO., LTD., Hangzhou (CN)

( * ) Notice: Subject to any disclaimer, the term of this patent is extended or adjusted under 35 U.S.C. 154(b) by 427 days.

(21) Appl. No.: 17/820,890

(22) Filed: Aug. 19, 2022

(65) Prior Publication Data

US 2022/0390284 A1    Dec. 8, 2022

Related U.S. Application Data

(63) Continuation of application No. PCT/CN2020/137162, filed on Dec. 17, 2020.

(30) Foreign Application Priority Data

Mar. 2, 2020  (CN) .......................... 202010137108.0

(51) Int. Cl.
  *G06T 9/00*     (2006.01)
  *G01J 5/00*     (2022.01)
  *G06V 10/74*    (2022.01)

(52) U.S. Cl.
  CPC  *G01J 5/00* (2013.01); *G06T 9/00* (2013.01); *G06V 10/761* (2022.01); *G01J 2005/0077* (2013.01); *G06T 2207/10048* (2013.01)

(58) Field of Classification Search
  CPC ............ G06T 9/00; G06T 2207/10048; G06V 10/761; H04N 5/33; H04N 19/00; G01J 5/00; G01J 2005/0077; G01J 2005/0092
  See application file for complete search history.

(56) References Cited

U.S. PATENT DOCUMENTS

2001/0033237 A1  10/2001  Kawai
2002/0083433 A1   6/2002  Yamanaka
(Continued)

FOREIGN PATENT DOCUMENTS

CN   101826929 A   9/2010
CN   102880635 A   1/2013
(Continued)

OTHER PUBLICATIONS

English translation of CN105657428A by computer (Year: 2016).*
(Continued)

*Primary Examiner* — Duy M Dang
(74) *Attorney, Agent, or Firm* — METIS IP LLC

(57) ABSTRACT

The present disclosure relates to systems and methods for processing infrared data. The methods may include obtaining one or more raw infrared data frames related to a target object. Each of the one or more raw infrared data frames may include raw infrared data including raw temperature information and raw grayscale information of the target object. The methods may further include generating one or more target infrared data frames corresponding to the one or more raw infrared data frames based on the raw infrared data. Each of the one or more target infrared data frames may include a frame header, an information header, and a data area. And for at least one of the one or more target infrared data frames, the data area may include substantially complete raw temperature information and substantially complete raw grayscale information.

19 Claims, 18 Drawing Sheets

(56) References Cited

U.S. PATENT DOCUMENTS

| | | |
|---|---|---|
| 2007/0120058 A1 | 5/2007 | Blackwell et al. |
| 2009/0016622 A1 | 1/2009 | Itakura |
| 2012/0081516 A1 | 4/2012 | Tsukagoshi |
| 2017/0164008 A1 | 6/2017 | Qu et al. |

FOREIGN PATENT DOCUMENTS

| | | |
|---|---|---|
| CN | 203414173 U | 1/2014 |
| CN | 103674266 A | 3/2014 |
| CN | 104217421 A | 12/2014 |
| CN | 104486640 A | 4/2015 |
| CN | 105657428 A | 6/2016 |
| CN | 106124061 A | 11/2016 |
| CN | 106130633 A | 11/2016 |
| CN | 106649474 A | 5/2017 |
| CN | 106936441 A | 7/2017 |
| CN | 109492543 A | 3/2019 |
| CN | 110277998 A | 9/2019 |
| CN | 111337133 A | 6/2020 |
| WO | 2013103522 A1 | 7/2013 |

OTHER PUBLICATIONS

International Search Report in PCT/CN2020/137162 mailed on Mar. 17, 2021, 6 pages.

Written Opinion in PCT/CN2020/137162 mailed on Mar. 17, 2021, 5 pages.

Evgeny Belyaev et al., An Efficient Storage of Infrared Video of Drone Inspections via Iterative Aerial Map Construction, IEEE Signal Processing Letters, 2019, 5 pages.

The Extended European Search Report in European Application No. 20923143.0 mailed on Apr. 17, 2023, 11 pages.

\* cited by examiner

400

Obtaining raw infrared data and related information, wherein the raw infrared data includes temperature information and grayscale information of a target object, and the related information at least includes a width of the raw infrared data and a height of the raw infrared data    410

Generating, based on the raw infrared data and the related information, target infrared data, wherein the target infrared data at least includes a frame header, an information header, and a data area    420

FIG. 4

|     |              | Temperature errors corresponding to different residual thresholds | | | | | | |
| --- | ------------ | ---- | ---- | ---- | ---- | ---- | ---- | ---- |
| NO. | Temperature/°C | 2 | 4 | 5 | 6 | 7 | 8 | 16 |
| 1 | -30~-20 | 0.08 | 0.15 | 0.19 | 0.23 | 0.27 | 0.31 | 0.62 |
| 2 | -20~-10 | 0.07 | 0.13 | 0.16 | 0.20 | 0.23 | 0.26 | 0.52 |
| 3 | -10~0 | 0.06 | 0.11 | 0.14 | 0.17 | 0.20 | 0.23 | 0.46 |
| 4 | 0~10 | 0.05 | 0.10 | 0.13 | 0.15 | 0.18 | 0.20 | 0.40 |
| 5 | 10~20 | 0.05 | 0.09 | 0.11 | 0.14 | 0.16 | 0.18 | 0.36 |
| 6 | 20~30 | 0.04 | 0.08 | 0.10 | 0.12 | 0.14 | 0.16 | 0.32 |
| 7 | 30~40 | 0.04 | 0.07 | 0.09 | 0.11 | 0.13 | 0.14 | 0.29 |
| 8 | 40~50 | 0.03 | 0.07 | 0.08 | 0.10 | 0.11 | 0.13 | 0.26 |
| 9 | 50~60 | 0.03 | 0.06 | 0.07 | 0.09 | 0.10 | 0.12 | 0.24 |
| 10 | 60~70 | 0.03 | 0.06 | 0.07 | 0.08 | 0.10 | 0.11 | 0.22 |
| 11 | 70~80 | 0.03 | 0.05 | 0.06 | 0.08 | 0.09 | 0.10 | 0.21 |
| 12 | 80~90 | 0.02 | 0.05 | 0.06 | 0.07 | 0.09 | 0.10 | 0.20 |
| 13 | 90~100 | 0.02 | 0.05 | 0.06 | 0.07 | 0.08 | 0.09 | 0.18 |
| 14 | 100~110 | 0.02 | 0.04 | 0.05 | 0.06 | 0.07 | 0.08 | 0.17 |
| 15 | 110~120 | 0.02 | 0.04 | 0.05 | 0.06 | 0.07 | 0.08 | 0.16 |
| 16 | 120~130 | 0.02 | 0.04 | 0.05 | 0.06 | 0.07 | 0.08 | 0.15 |
| 17 | 130~140 | 0.02 | 0.04 | 0.04 | 0.05 | 0.06 | 0.07 | 0.14 |
| 18 | 140~150 | 0.02 | 0.03 | 0.04 | 0.05 | 0.06 | 0.07 | 0.14 |

FIG. 10

|     |              | Residual thresholds corresponding to different temperature errors |      |      |      |      |      |       |
| --- | ------------ | ---- | ---- | ---- | ---- | ---- | ---- | ----- |
| NO. | Temperature/°C | 0.02 | 0.05 | 0.1  | 0.2  | 0.3  | 0.5  | 1     |
| 1   | -30~-20      | 0.5  | 1.3  | 2.6  | 5.2  | 7.8  | 13.0 | 26.0  |
| 2   | -20~-10      | 0.6  | 1.5  | 3.0  | 6.1  | 9.1  | 15.2 | 30.5  |
| 3   | -10~0        | 0.7  | 1.8  | 3.5  | 7.0  | 10.5 | 17.5 | 35.0  |
| 4   | 0~10         | 0.8  | 2.0  | 4.0  | 7.9  | 11.9 | 19.8 | 39.6  |
| 5   | 10~20        | 0.9  | 2.2  | 4.4  | 8.8  | 13.2 | 22.0 | 44.1  |
| 6   | 20~30        | 1.0  | 2.5  | 5.1  | 10.1 | 15.2 | 25.3 | 50.7  |
| 7   | 30~40        | 1.1  | 2.8  | 5.6  | 11.1 | 16.7 | 27.8 | 55.6  |
| 8   | 40~50        | 1.2  | 3.1  | 6.1  | 12.3 | 18.4 | 30.7 | 61.4  |
| 9   | 50~60        | 1.4  | 3.4  | 6.8  | 13.6 | 20.3 | 33.9 | 67.8  |
| 10  | 60~70        | 1.4  | 3.6  | 7.2  | 14.5 | 21.7 | 36.2 | 72.4  |
| 11  | 70~80        | 1.5  | 3.9  | 7.7  | 15.4 | 23.1 | 38.6 | 77.1  |
| 12  | 80~90        | 1.6  | 4.1  | 8.2  | 16.4 | 24.6 | 40.9 | 81.9  |
| 13  | 90~100       | 1.8  | 4.4  | 8.9  | 17.7 | 26.6 | 44.3 | 88.6  |
| 14  | 100~110      | 1.9  | 4.8  | 9.5  | 19.1 | 28.6 | 47.6 | 95.3  |
| 15  | 110~120      | 2.0  | 5.1  | 10.2 | 20.4 | 30.6 | 51.0 | 102.0 |
| 16  | 120~130      | 2.1  | 5.3  | 10.7 | 21.3 | 32.0 | 53.3 | 106.5 |
| 17  | 130~140      | 2.2  | 5.6  | 11.1 | 22.2 | 33.3 | 55.6 | 111.1 |
| 18  | 140~150      | 2.3  | 5.8  | 11.6 | 23.2 | 34.7 | 57.9 | 115.8 |

FIG. 11

SYSTEMS AND METHODS FOR PROCESSING INFRARED DATA

CROSS-REFERENCE TO RELATED APPLICATIONS

This application is a continuation of International Application No. PCT/CN2020/137162, filed on Dec. 17, 2020, which claims priority to Chinese Patent Application No. 202010137108.0 filed on Mar. 2, 2020, the contents of which are incorporated herein by reference in their entirety.

TECHNICAL FIELD

The present disclosure generally relates to data processing field, and in particular, to systems and methods for processing infrared data.

BACKGROUND

With the development of infrared temperature measurement technology, infrared devices (e.g., an online device, a handheld device) have been used in various fields such as intelligent power, infrared security, forest fire prevention, etc. The infrared data acquired by the infrared devices include various useful information, such as temperature information, grayscale information, which can be used for further processing or analysis. However, the transmission and/or storage of the infrared data requires relatively high computing load, which may limit the effective use of the infrared data. Therefore, it is desirable to provide systems and methods for processing infrared data effectively and efficiently, which can improve data compression rate and retain temperature information and grayscale information in raw infrared data, thereby improving the use of the infrared data.

SUMMARY

An aspect of the present disclosure relates to a system for processing infrared data. The system may include at least one storage device including a set of instructions and at least one processor in communication with the at least one storage device. When executing the set of instructions, the at least one processor may be directed to cause the system to obtain one or more raw infrared data frames related to a target object. Each of the one or more raw infrared data frames may include raw infrared data including raw temperature information and raw grayscale information of the target object. And the at least one processor may be directed to cause the system further to generate one or more target infrared data frames corresponding to the one or more raw infrared data frames based on the raw infrared data. Each of the one or more target infrared data frames may include a frame header, an information header, and a data area. And for at least one of the one or more target infrared data frames, the data area may include substantially complete raw temperature information and substantially complete raw grayscale information.

Another aspect of the present disclosure relates to a system for parsing infrared data. The system may include at least one storage device including a set of instructions and at least one processor in communication with the at least one storage device. When executing the set of instructions, the at least one processor may be directed to cause the system to obtain one or more target infrared data frames related to a target object. Each of the one or more target infrared data frames may include compressed infrared data. Each of the one or more target infrared data frames may include a frame header, an information header, and a data area. And for at least one of the one or more target infrared data frames, the data area may include substantially complete raw temperature information and substantially complete raw grayscale information of the target object. And the at least one processor may be directed to cause the system further to generate one or more raw infrared data frames corresponding to the one or more target infrared data frames based on the compressed infrared data.

A further aspect of the present disclosure relates to a method for processing infrared data. The method may be implemented on a computing device including at least one processor and at least one storage. The method may include obtaining one or more raw infrared data frames related to a target object. Each of the one or more raw infrared data frames may include raw infrared data including raw temperature information and raw grayscale information of the target object. And the method may further include generating one or more target infrared data frames corresponding to the one or more raw infrared data frames based on the raw infrared data. Each of the one or more target infrared data frames may include a frame header, an information header, and a data area. And for at least one of the one or more target infrared data frames, the data area may include substantially complete raw temperature information and substantially complete raw grayscale information.

A still further aspect of the present disclosure relates to a method for parsing infrared data. The method may be implemented on a computing device including at least one processor and at least one storage. The method may include obtaining one or more target infrared data frames related to a target object. Each of the one or more target infrared data frames may include compressed infrared data. Each of the one or more target infrared data frames may include a frame header, an information header, and a data area. And for at least one of the one or more target infrared data frames, the data area may include substantially complete raw temperature information and substantially complete raw grayscale information of the target object. And the method may further include generating one or more raw infrared data frames corresponding to the one or more target infrared data frames based on the compressed infrared data.

A still further aspect of the present disclosure relates to a system for processing infrared data. The system may include a raw infrared data frame obtaining module configured to obtain one or more raw infrared data frames related to a target object. Each of the one or more raw infrared data frames may include raw infrared data including raw temperature information and raw grayscale information of the target object. And the system may further include a target infrared data frame generation module configured to generate one or more target infrared data frames corresponding to the one or more raw infrared data frames based on the raw infrared data. Each of the one or more target infrared data frames may include a frame header, an information header, and a data area. And for at least one of the one or more target infrared data frames, the data area may include substantially complete raw temperature information and substantially complete raw grayscale information.

A still further aspect of the present disclosure relates to a system for parsing infrared data. The system may include a target infrared data frame obtaining module configured to obtain one or more target infrared data frames related to a target object. Each of the one or more target infrared data frames may include compressed infrared data. Each of the one or more target infrared data frames may include a frame header, an information header, and a data area. And for at least one of the one or more target infrared data frames, the data area may include substantially complete raw temperature information and substantially complete raw grayscale information of the target object. And the system may further include a raw infrared data frame generation module configured to generate one or more raw infrared data frames corresponding to the one or more target infrared data frames based on the compressed infrared data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a flowchart illustrating an exemplary process for generating target infrared data according to some embodiments of the present disclosure;

FIG. 10 is a schematic diagram illustrating exemplary temperature errors corresponding to different residual thresholds according to some embodiments of the present disclosure;

FIG. 11 is a schematic diagram illustrating exemplary residual thresholds corresponding to different temperature errors according to some embodiments of the present disclosure;

DETAILED DESCRIPTION

Figure 1:
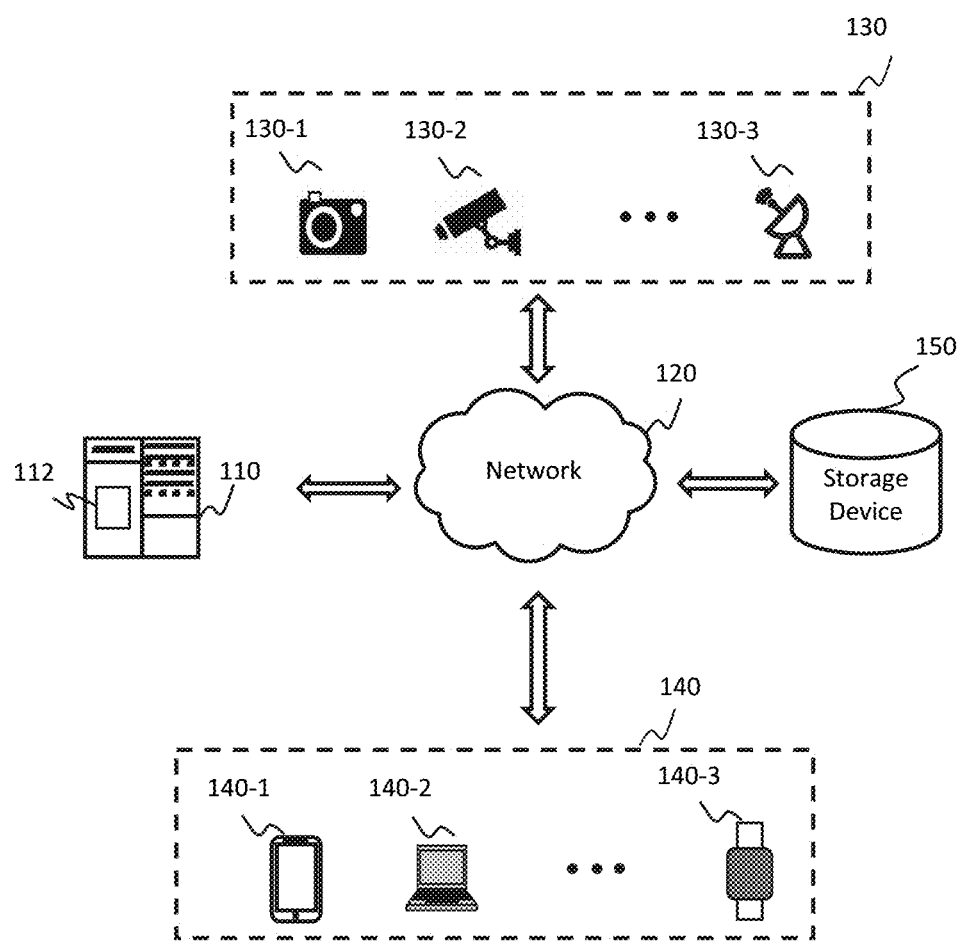
FIG. 1 is a schematic diagram illustrating an exemplary infrared data processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expression if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

In the present disclosure, the terms "raw infrared data" and "raw infrared data frame" may be used interchangeably, the terms "target infrared data" and "target infrared data frame" may be used interchangeably, the terms "reference data" and "reference data frame" may be used interchangeably, the terms "raw infrared data frame" and "frame of raw infrared data" may be used interchangeably, the terms "target infrared data frame" and "frame of target infrared data" may be used interchangeably, and the terms "compress" and "perform a compression operation" may be used interchangeably.

An aspect of the present disclosure relates to systems and methods for processing infrared data. The systems may obtain one or more raw infrared data frames related to a target object. Each of the one or more raw infrared data frames may include raw infrared data including raw temperature information and raw grayscale information of the target object. The systems may further generate one or more target infrared data frames corresponding to the one or more raw infrared data frames based on the raw infrared data. Each of the one or more target infrared data frames may include a frame header, an information header, and a data area. And for at least one of the one or more target infrared data frames, the data area may include substantially complete raw temperature information and substantially complete raw grayscale information. According to the systems and methods of the present disclosure, substantially complete raw temperature information and substantially complete raw grayscale information of the target object may be retained in the one or more target infrared data frames, which can be converted into images (e.g., grayscale images) and/or used for temperature measurements. Additionally, for at least one of the one or more target infrared data frames, the data area only includes residual data between corresponding raw infrared data and reference data, which can improve transmission and storage efficiency of the target infrared data.

FIG. 1 is a schematic diagram illustrating an exemplary infrared data processing system according to some embodiments of the present disclosure. As illustrated, the infrared data processing system 100 may include a server 110, a network 120, an acquisition device 130, a user device 140, and a storage device 150.

The server 110 may be a single server or a server group. The server group may be centralized or distributed (e.g., the server 110 may be a distributed system). In some embodiments, the server 110 may be local or remote. For example, the server 110 may access information and/or data stored in the acquisition device 130, the user device 140, and/or the storage device 150 via the network 120. As another example, the server 110 may be directly connected to the acquisition device 130, the user device 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 including one or more components illustrated in FIG. 2 of the present disclosure.

In some embodiments, the server 110 may include a processing device 112. The processing device 112 may process information and/or data relating to infrared data processing to perform one or more functions described in the present disclosure. For example, the processing device 112 may cause the acquisition device 130 to acquire one or more raw infrared data frames related to a target object. The processing device 112 may obtain the one or more raw infrared data frames from the acquisition device 130 or a storage device (e.g., the storage device 150). Further, the processing device 112 may generate one or more target infrared data frames corresponding to the one or more raw infrared data frames by compressing raw infrared data included in the one or more raw infrared data frames. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the acquisition device 130, the user device 140) of the infrared data processing system 100. For example, the processing device 112 may be integrated in the acquisition device 130 or the user device 140 and the functions (e.g., processing infrared data) of the processing device 112 may be implemented by the acquisition device 130 or the user device 140.

The network 120 may facilitate exchange of information and/or data for the infrared data processing system 100. In some embodiments, one or more components (e.g., the server 110, the acquisition device 130, the user device 140, the storage device 150) of the infrared data processing system 100 may transmit information and/or data to other component(s) of the infrared data processing system 100 via the network 120. For example, the acquisition device 130 may acquire one or more raw infrared data frames and transmit the one or more raw infrared data frames to the server 110 or the storage device 150 via the network 120. In some embodiments, the network 120 may be any type of wired or wireless network, or combination thereof. Merely by way of example, the network 120 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof.

The acquisition device 130 may be configured to acquire an image (the "image" herein may refer to a single image or a frame of a video) and/or a video. In some embodiments, the acquisition device 130 may include a camera 130-1, a video recorder 130-2, an image sensor 130-3, or the like, or any combination thereof. The camera 130-1 may include a gun camera, a dome camera, an integrated camera, a monocular camera, a binocular camera, a multi-view camera, or the like, or any combination thereof. The video recorder 130-2 may include a PC Digital Video Recorder (DVR), an embedded DVR, or the like, or any combination thereof. The image sensor 130-1 may include a Charge Coupled Device (CCD), a Complementary Metal Oxide Semiconductor (CMOS), an infrared sensor, or the like, or any combination thereof. In some embodiments, the acquisition device 130 may include a thermal imaging device which can acquire one or more raw infrared data frames related to a target object. Each of the one or more raw infrared data frames may include raw infrared data including raw temperature information and raw grayscale information of the target object. The raw infrared data may be used to obtain a temperature of each pixel in the raw infrared data, which may be further used for regular temperature measurement, temperature proportion statistics, temperature alarm, isotherm determination, grayscale image generation and/or display, pseudo-color image generation and/or display, or the like, or any combination thereof. In some embodiments, the acquisition device 130 may transmit the acquired raw infrared data frames to one or more components (e.g., the server 110, the user device 140, the storage device 150) of the infrared data processing system 100 via the network 120.

The user device 140 may be configured to receive information and/or data from the server 110, the acquisition device 130, and/or the storage device 150 via the network 120. For example, the user device 140 may receive one or more target infrared data frames from the server 110 for further processing (e.g., parsing, display). In some embodiments, the user device 140 may provide a user interface via which a user may view information and/or input data and/or instructions to the infrared data processing system 100. For example, the user may view a grayscale image generated based on raw infrared data via the user interface. As another example, the user may input an instruction associated with group of pictures (GOP) (e.g., an interval between two adjacent target infrared data frames of a specified type) via the user interface. In some embodiments, the user device 140 may include a mobile phone 140-1, a computer 140-2, a wearable device 140-3, or the like, or any combination thereof. In some embodiments, the user device 140 may include a display that can display information in a human-readable form, such as text, image, audio, video, graph, animation, or the like, or any combination thereof. The display of the user device 140 may include a cathode ray tube (CRT) display, a liquid crystal display (LCD), a light emitting diode (LED) display, a plasma display panel (PDP), a three dimensional (3D) display, or the like, or a combination thereof. In some embodiments, the user device 140 may be connected to one or more components (e.g., the server 110, the acquisition device 130, the storage device 150) of the infrared data processing system 100 via the network 120.

The storage device 150 may be configured to store data and/or instructions. The data and/or instructions may be obtained from, for example, the server 110, the acquisition device 130, and/or any other component of the infrared data processing system 100. In some embodiments, the storage device 150 may store data and/or instructions that the server 110 may execute or use to perform exemplary methods described in the present disclosure. For example, the storage device 150 may store one or more raw infrared data frames related to a target object. As another example, the storage device 150 may store one or more one or more thresholds that may be used for processing one or more raw infrared data frames. As a further example, the storage device 150 may store instructions that the processing device 112 may execute to process (e.g., compress) the raw infrared data frames. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components (e.g., the server 110, the acquisition device 130, the user device 140) of the infrared data processing system 100. One or more components of the infrared data processing system 100 may access the data or instructions stored in the storage device 150 via the network 120. In some embodiments, the storage device 150 may be directly connected to or communicate with one or more components (e.g., the server 110, the acquisition device 130, the user device 140) of the infrared data processing system 100. In some embodiments, the storage device 150 may be part of other components of the infrared data processing system 100, such as the server 110, the acquisition device 130, or the user device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
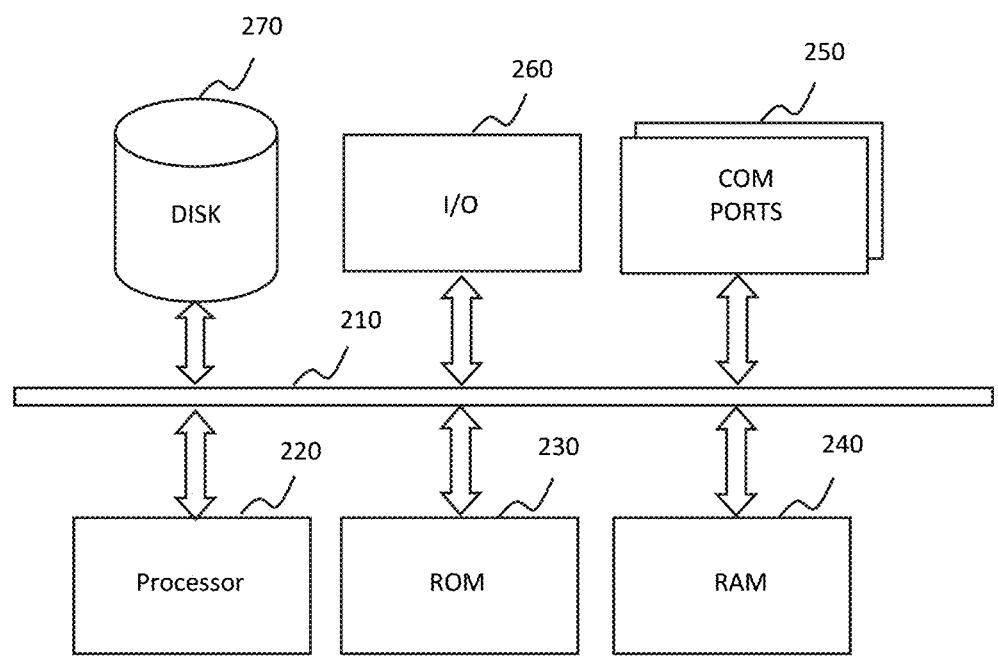
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The computing device 200 may be used to implement any component of the infrared data processing system 100 as described herein. For example, the processing device 112 may be implemented on the computing device 200, via its hardware, software program, firmware, or a combination thereof. Although only one such computer is shown, for convenience, the computer functions relating to image processing as described herein may be implemented in a distributed fashion on a number of similar platforms to distribute the processing load.

The computing device 200, for example, may include COM ports 250 (also referred to as "transmission device") connected to and from a network connected thereto to facilitate data communications. The COM ports 250 may be used to receive or send data via a network (e.g., a wireless network provided by a communication provider of the computing device 200). In some embodiments, the COM ports 250 may include a network interface controller (NIC), which may be connected to other network devices via a base station to communicate with the Internet. In some embodiments, the COM ports 250 may be a radio frequency (RF) module, which may be used to communicate with the Internet wirelessly.

The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210. As another example, the processor 220 may include a processing device such as a microcontroller unit (MCU), a field programmable gate array (FPGA), etc.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. In some embodiments, the program storage and/or the data storage may be used to store computer programs (software programs and modules of application software), such as computer programs corresponding to a method for processing infrared data in the present disclosure. The processor 220 may execute the computer programs so as to perform various applications or data processing. In some embodiments, the program storage and/or the data storage may include a high-speed RAM, a non-volatile memory, such as a magnetic storage device, a flash memory, or other non-volatile solid-state memory. In some embodiments, the program storage and/or the data storage may also include memories remotely set with respect to the processor 220. The remote memories may be connected to the computing device 200 via a network. Exemplary networks may include the Internet, an intranet, a local area network, a mobile communication network, or a combination thereof.

The computing device 200 may also include an I/O component 260, supporting input/output between the computing device 200 and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
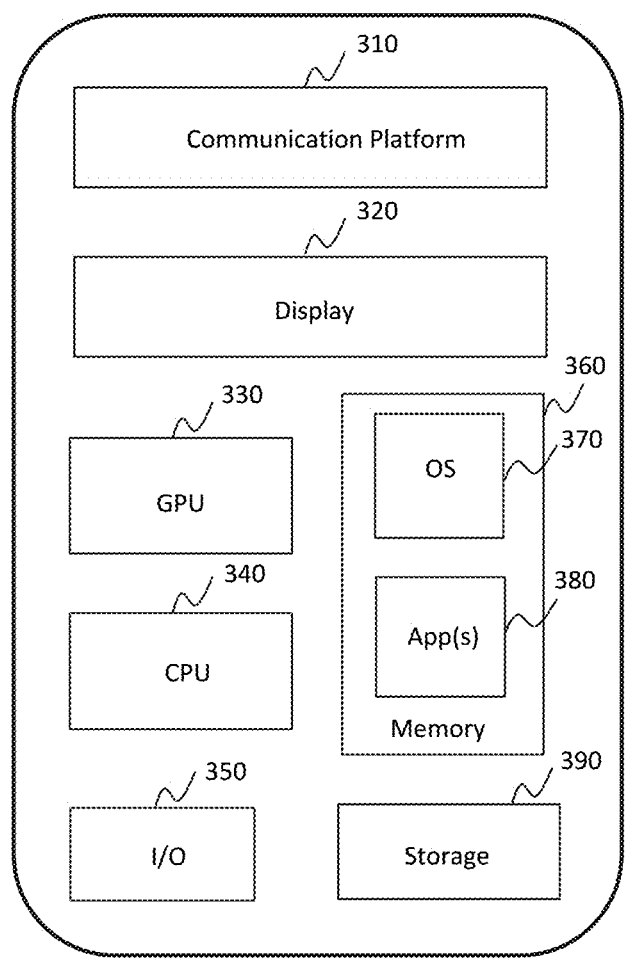
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the user device 140 may be implemented on the mobile device 300 shown in FIG. 3.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™) and one or more applications (Apps) 380 may be loaded into the memory 360 from the storage 390 in order to be executed by the CPU 340. The applications 380 may include a browser or any other suitable mobile apps for receiving and rendering information relating to image processing or other information from the processing device 112. User interactions may be achieved via the I/O 350 and provided to the processing device 112 and/or other components of the infrared data processing system 100 via the network 120.

FIG. 4 is a flowchart illustrating an exemplary process for generating target infrared data according to some embodiments of the present disclosure. In some embodiments, the process 400 may be implemented as a set of instructions (e.g., an application) stored in the storage ROM 230 or RAM 240. The processor 220 and/or the modules in FIG. 15 may execute the set of instructions, and when executing the instructions, the processor 220 and/or the modules may be configured to perform the process 400. The operations of the illustrated process presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, raw infrared data and related information may be obtained. In some embodiments, the raw infrared data may include temperature information and grayscale information of a target object. In some embodiments, the related information may include a width of the raw infrared data and a height of the raw infrared data, for example, a width and a height of an infrared data frame.

Figure 15:
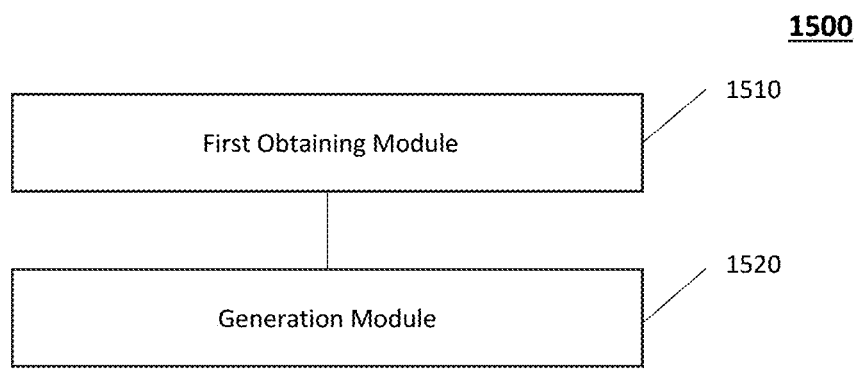
FIG. 15 is a block diagram illustrating an exemplary infrared data generation device according to some embodiments of the present disclosure.

In some embodiments, the raw infrared data and related information may be obtained by an infrared data generation device 1500 (e.g., a first obtaining module 1510) illustrated in FIG. 15. For example, the raw infrared data may be acquired by the acquisition device 130. The first obtaining module 1510 may obtain the raw infrared data from the acquisition device 130 directly and determine the related information based on the raw infrared data. As another example, the raw infrared data may be stored in a storage device (e.g., the storage device 150) disclosed elsewhere in the present disclosure. The first obtaining module 1510 may obtain the raw infrared data from the storage device.

In 420, target infrared data may be generated based on the raw infrared data and the related information. In some embodiments, the target infrared data may at least include a frame header, an information header, and a data area. In some embodiments, the target infrared data may be generated by the infrared data generation device 1500 (e.g., a generation module 1520) illustrated in FIG. 15.

In some embodiments, to generate the target infrared data based on the raw infrared data and the related information, the frame header of the target infrared data may be generated. The frame header may include a frame identifier, a frame size (e.g., a frame length), or the like, or any combination thereof. As used herein, the frame identifier may be an identifier used for identifying whether the frame header is a normal frame header. Further, the information header of the target infrared data may be generated. The information header may include a width of the raw infrared data, a height of the raw infrared data, a size of compressed raw infrared data, a compression algorithm used to compress the raw infrared data, or the like, or any combination thereof. In some embodiments, the information header may also include other information such as a generation time of the target infrared data, manufacturer information, etc. Furthermore, the data area of the target infrared data may be generated. The data area may include the compressed raw infrared data.

In some embodiments, to generate the data area of the target infrared data, a compression type corresponding to current raw infrared data (e.g., a current raw infrared data frame) may be determined. As used herein, the compression type may include a first compression type or a second compression type.

If the compression type corresponding to the current raw infrared data is the first compression type, first compressed infrared data may be obtained by performing a first compression operation (e.g., a lossless compression) on the current raw infrared data. In this situation, the "compressed raw infrared data" in the data area of the target infrared data may refer to the first compressed infrared data. In some embodiments, the current raw infrared data may be further determined as reference data for next infrared data (e.g., a next raw infrared data frame). Alternatively or additionally, if the compression type corresponding to the current raw infrared data is the first compression type, a temperature measurement algorithm used for converting the raw infrared data into temperature information may be written in the information header of the target infrared data, accordingly, temperature measurement parameters used for converting the current raw infrared data into temperature information may be written in the data area of the target infrared data. As used herein, the reason why the temperature measurement parameters are stored in the data area is that different temperature measurement algorithms correspond to different lengths of temperature measurement parameters, which results in that the length of the temperature measurement parameters is unpredictable and further results in that the data structure may be corrupted if the temperature measurement parameters are stored in the frame header or the information header.

If the compression type corresponding to the current raw infrared data is the second compression type, residual data between the current raw infrared data and reference data may be obtained. Specifically, if the raw infrared data is image data, a pixel value of each pixel in the image data may be obtained. Then difference data (also referred to as a "difference data frame") between the current raw infrared data and the reference data at each pixel (also referred to as a "difference value of each pixel") may be obtained by subtracting a pixel value of a pixel in the current raw infrared data from a pixel value of a pixel at a same position in the reference data. Further, the residual data between the current raw infrared data and the reference data may be obtained by setting pixel values (i.e., difference values) of pixels in the difference data which are less than a predetermined threshold as zeros. After the residual data is obtained, second compressed infrared data (also referred to as "compressed residual data") may be obtained by performing a second compression operation (e.g., lossless compression or a lossy compression) on the residual data. In this situation, the "compressed raw infrared data" in the data area of the target infrared data may refer to the second compressed infrared data, accordingly, the "size of compressed raw infrared data" in the information header refers to a size of the compressed residual data. In some embodiments, updated reference data for next infrared data (e.g., a next raw infrared data frame) may be further obtained by adding the reference data to the residual data.

In some embodiments, the first compression type may be defined as an I frame type which means that a lossless compression may be performed on the current raw infrared data, accordingly, a target infrared data frame corresponding to the first compression type may be referred to as an I frame (also referred to as "first type of target infrared data frame").

In some embodiments, the second compression type may be defined as a P frame type which means that a lossless compression (or a lossy compression) may be performed on the residual data, accordingly, a target infrared data frame corresponding to the second compression type may be referred to as a P frame (also referred to as "second type of target infrared data frame"). In some embodiments, there may be N P frames between two adjacent I frames, wherein N is an integer greater than or equal to 0. In some situations, if all the raw infrared data frames are compressed according to the I frame type, a size of compressed raw infrared data would be too large. For example, in a static scenario with relatively stable environmental parameters, difference between two adjacent raw infrared data frames may be relatively small, therefore, if all the raw infrared data frames are compressed according to the I frame type, a waste of resources may be caused. In order to reduce the waste of resources, a fixed count of P frames (i.e., fixed group of pictures (GOP)) or a dynamic count of P frames (i.e., dynamic GOP) between two I frames may be defined. That is, at least a portion of the raw infrared data frames are compressed as P frames which are obtained by compressing residual data.

Specifically, if the current raw infrared data corresponds to the first frame of the target infrared data, the compression type corresponding to the current raw infrared data may be determined as the first compression type. If a count of frames between the current raw infrared data and a previous frame of raw infrared data (also referred to as a "raw infrared data frame") corresponding to the first compression type is less than a first threshold, the compression type may be determined as the second compression type. And if the count of frames between the current raw infrared data and the previous frame of raw infrared data corresponding to the first compression type reaches (or larger than or equal to) the first threshold, the compression type may be determined as the first compression type. Accordingly, target infrared data frames obtained in this way corresponds to a fixed GOP which means that a count of P frames between any adjacent two I frames is fixed. In some embodiments, if a count of pixels where the residual data between the current raw infrared data and the reference data is zero is less than a second threshold, the compression type corresponding to a next frame of raw infrared data may be determined as the first compression type. And if the count of pixels where the residual data between the current raw infrared data and the reference data is zero is larger than or equal to the second threshold, the compression type corresponding to a next frame of raw infrared data may be determined as the second compression type. Accordingly, target infrared data frames obtained in this way corresponds to a dynamic GOP which means that a count of P frames between any adjacent two I frames is adjustable. More descriptions regarding the fixed GOP and/or the dynamic GOP may be found elsewhere in the present disclosure (e.g., FIG. 7, FIG. 8, and the descriptions thereof).

It should be noted that the above description of the process 400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 400. In the storing operation, information and/or data (e.g., the target infrared data) associated with the infrared data processing may be stored in a storage device (e.g., the storage device 150) disclosed elsewhere in the present disclosure.

Figure 5:
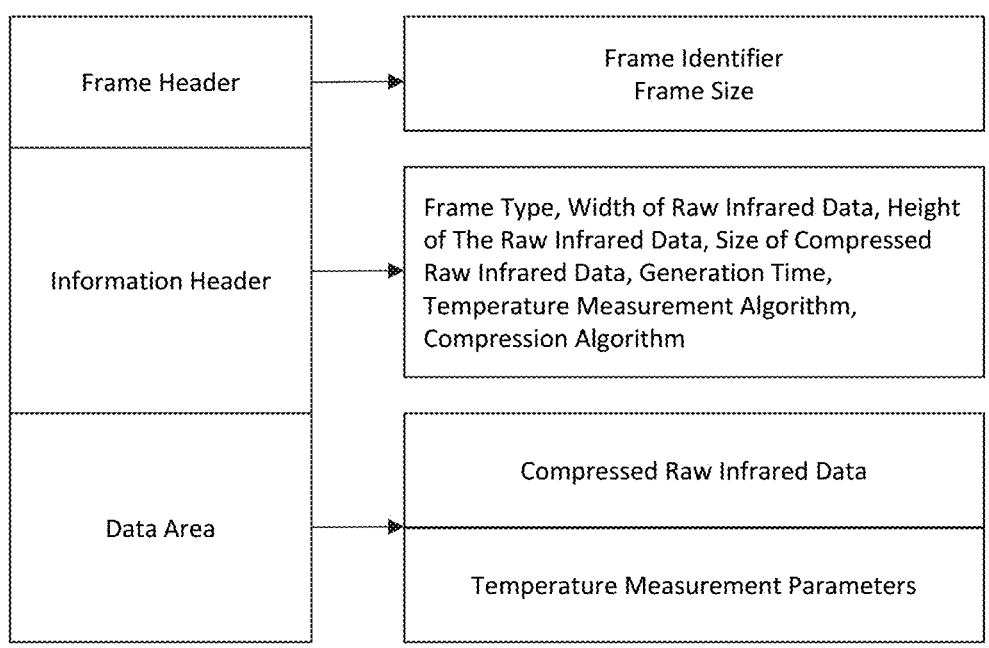
FIG. 5 is a schematic diagram illustrating exemplary target infrared data according to some embodiments of the present disclosure.

FIG. 5 is a schematic diagram illustrating exemplary target infrared data corresponding to the first compression type according to some embodiments of the present disclosure. As illustrated in FIG. 5, first target infrared data (e.g., a first target infrared data frame) corresponding to the first compression type (i.e., an I frame type) may include a first frame header, a first information header, and a first data area. In some embodiments, the first frame header may include but is not limited to a frame identifier and a frame size corresponding to the first target infrared data. The first information header may include but is not limited to a frame type (e.g., an I frame type or a P frame type) corresponding to the first target infrared data, a width of raw infrared data, a height of the raw infrared data, a size of compressed raw infrared data, a compression algorithm used to compress the raw infrared data, a temperature measurement algorithm used for converting the raw infrared data into temperature information, a generation time of the first target infrared data, manufacturer information, or the like, or any combination thereof. The first data area may include compressed raw infrared data, temperature measurement parameters (e.g., an atmospheric temperature, an atmospheric humidity, a temperature measurement distance, an environment type (e.g., indoor environment, outdoor environment)), or the like, or any combination thereof.

Figure 6:
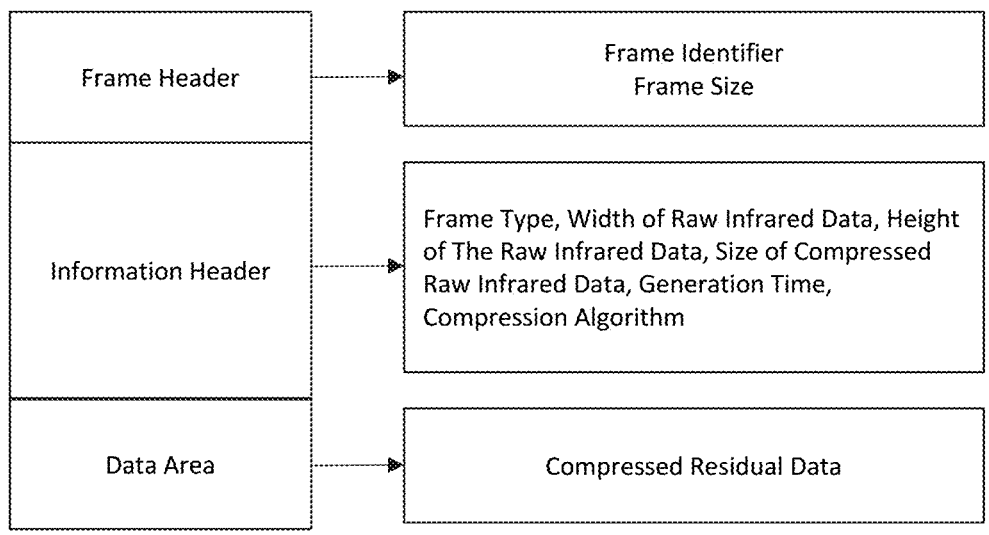
FIG. 6 is another schematic diagram illustrating exemplary target infrared data according to some embodiments of the present disclosure.

FIG. 6 is a schematic diagram illustrating exemplary target infrared data corresponding to the second compression type according to some embodiments of the present disclosure. As illustrated in FIG. 6, second target infrared data corresponding to the second compression type (i.e., a P frame type) may include a second frame header, a second information header, and a second data area. In some embodiments, the second frame header may include but is not limited to a frame identifier and a frame size corresponding to the second target infrared data. The second information header may include but is not limited to a frame type (e.g., an I frame type or a P frame type) corresponding to the second target infrared data, a width of raw infrared data, a height of the raw infrared data, a size of compressed raw infrared data (i.e., a size of compressed residual data), a compression algorithm used to compress the raw infrared data, a generation time of the first target infrared data, manufacturer information, or the like, or any combination thereof. The second data area may include compressed residual data.

Figure 7:
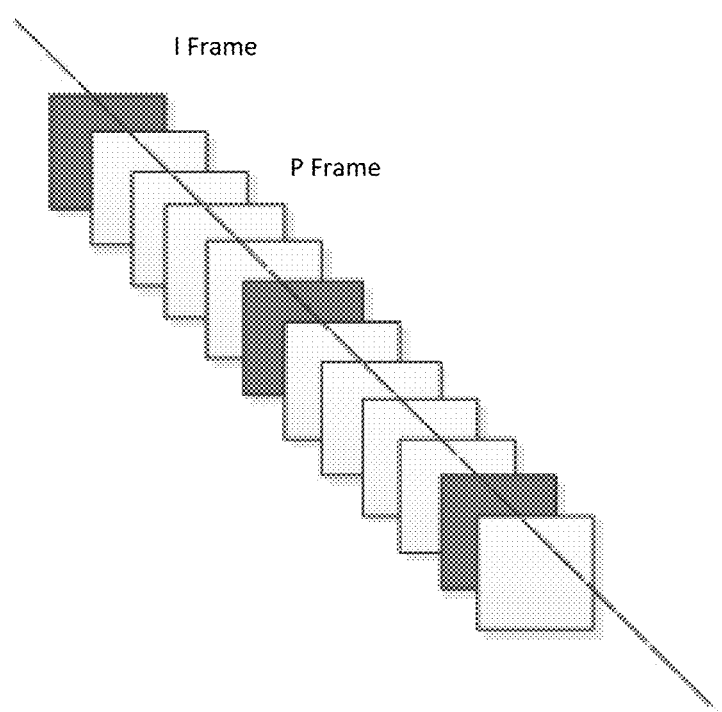
FIG. 7 is a schematic diagram illustrating an exemplary fixed group of pictures (GOP) according to some embodiments of the present disclosure.

FIG. 7 is a schematic diagram illustrating an exemplary fixed group of pictures (GOP) according to some embodiments of the present disclosure. As illustrated in FIG. 7, a dark gray rectangle represents an I frame and a light gray rectangle represents a P frame. It can be seen that a count of P frames between any adjacent two I frames is 4, that is, the GOP is fixed. As described in connection with FIG. 4, whether a count of P frames between the current raw infrared data and a previous I frame is less than a first threshold (e.g., 4) may be determined. If the count of P frames between the current raw infrared data and a previous I frame is less than the first threshold, the frame type corresponding to a next frame of raw infrared data may be determined as a P frame; if the count of P frames between the current raw infrared data and a previous I frame reaches (or larger than or equal to) the first threshold, the frame type corresponding to the next frame of raw infrared data may be determined as an I frame.

Figure 8:
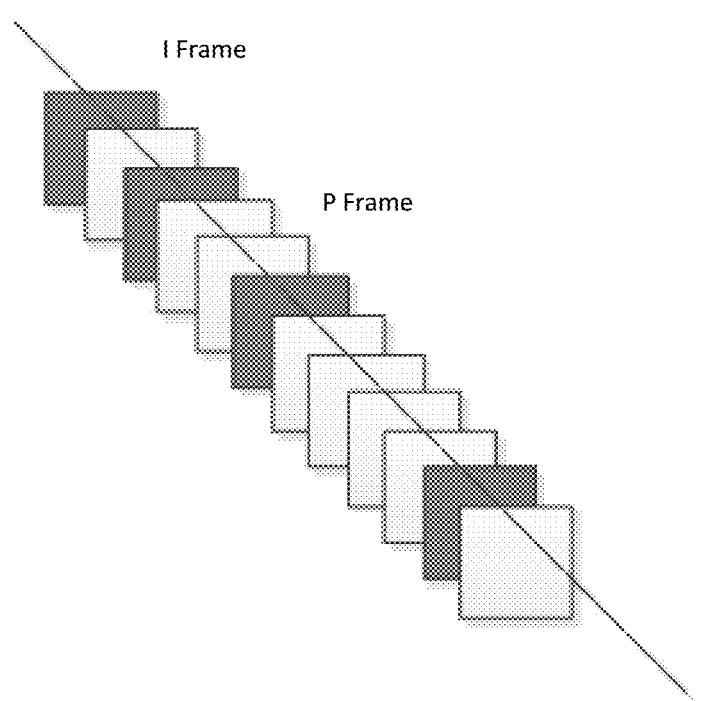
FIG. 8 is a schematic diagram illustrating an exemplary dynamic GOP according to some embodiments of the present disclosure.

FIG. 8 is a schematic diagram illustrating an exemplary dynamic group of pictures (GOP) according to some embodiments of the present disclosure. As illustrated in FIG. 8, a dark gray rectangle represents an I frame and a light gray rectangle represents a P frame. It can be seen that a count of P frames between any adjacent two I frames is changeable. As described in connection with FIG. 4, whether a count of pixels where residual data between the current raw infrared data and reference data is zero is less than a second threshold may be determined. If the count of pixels where residual data between the current raw infrared data and reference data is zero is less than the second threshold, the frame type corresponding to the current raw infrared data may be determined as an I frame; if the count of pixels where residual data between the current raw infrared data and reference data is zero is larger than or equal to the second threshold, the frame type corresponding to the current raw infrared data may be determined as a P frame.

Figure 9:
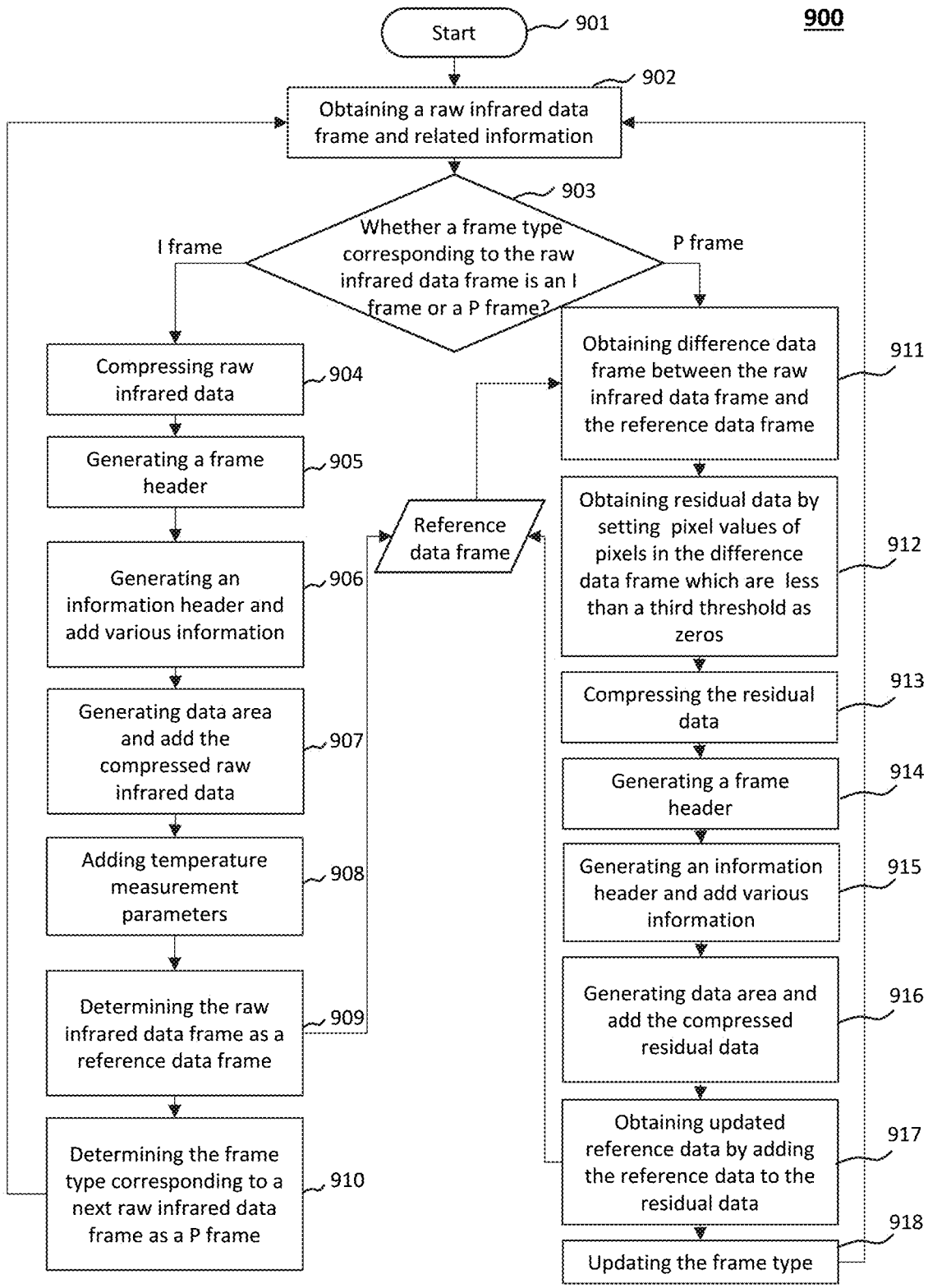
FIG. 9 is a flowchart illustrating an exemplary process for generating target infrared data according to some embodiments of the present disclosure.

FIG. 9 is a flowchart illustrating an exemplary process for generating target infrared data according to some embodiments of the present disclosure. In some embodiments, the process 900 may be implemented as a set of instructions (e.g., an application) stored in the storage ROM 230 or RAM 240. The processor 220 and/or the modules in FIG. 15 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 901, system initialization may be performed and a frame type may be determined as an I frame.

In 902, a raw infrared data frame and related information may be obtained. As described in connection with operation 410, the raw infrared data and related information may be obtained by the infrared data generation device 1500 (e.g., the first obtaining module 1510) illustrated in FIG. 15.

In 903, whether the frame type corresponding to the raw infrared data frame is an I frame or a P frame may be determined.

In 904, in response to a determination that the frame type corresponding to the raw infrared data frame is an I frame, compressed raw infrared data (also referred to as "first compressed infrared data") may be obtained by performing a lossless compression on raw infrared data included in the raw infrared data frame according to a lossless compression algorithm.

In 905, a frame header of target infrared data may be generated. The frame header may include a frame identifier and a frame size.

In 906, an information header of the target infrared data may be generated. The information header may include a frame type, a width of the raw infrared data, a height of the raw infrared data, a size of compressed raw infrared data, a compression algorithm used to compress the raw infrared data, a temperature measurement algorithm used for converting the current raw infrared data into temperature information, a generation time of the target infrared data, manufacturer information, etc.

In 907, a data area of the target infrared data may be generated. The data area may include compressed raw infrared data.

In 908, temperature measurement parameters (e.g., an atmospheric temperature, an atmospheric humidity, a temperature measurement distance, an environment type (e.g., indoor environment, outdoor environment)) may be written in the data area.

In 909, the raw infrared data frame may be determined as a reference data frame.

In 910, the frame type corresponding to a next raw infrared data frame may be determined as a P frame.

In 911, in response to a determination that the frame type corresponding to the raw infrared data frame is a P frame, a difference data frame between the raw infrared data frame and the reference data frame may be determined by subtracting a pixel value of a pixel in the raw infrared data frame from a pixel value of a pixel at a same position in the reference data frame.

In 912, residual data between the raw infrared data frame and the reference data frame may be obtained by setting pixel values of pixels in the difference data frame which are less than a predetermined threshold (also referred to as a "residual threshold") as zeros. In some embodiments, the residual threshold may be a fixed threshold or an adjustable threshold. For example, the residual threshold may be defined based on temperature error. More descriptions may be found elsewhere in the present disclosure (e.g., FIG. 10, FIG. 11, and the descriptions thereof).

In 913, compressed residual data (also referred to as "second compression infrared data") may be obtained by performing a lossless compression on the residual data.

In 914, a frame header of target infrared data may be generated. The frame header may include a frame identifier and a frame size.

In 915, an information header of the target infrared data may be generated. The information header may include a frame type, a width of the raw infrared data, a height of the raw infrared data, a size of the compressed residual data, a compression algorithm used to compress the residual data, a generation time of the target infrared data, manufacturer information, etc.

In 916, a data area of the target infrared data may be generated. The data area may include compressed residual data.

In 917, updated reference data may be obtained by adding the reference data to the residual data.

In 918, a frame type corresponding to a next raw infrared data frame may be determined. Specifically, if the process 900 is performed based on a fixed GOP, whether a count of P frames between the next raw infrared data frame and a previous I frame is less than a first threshold may be determined. If the count of P frames between the next raw infrared data frame and a previous I frame is less than the first threshold, the frame type corresponding to the next raw infrared data frame may be determined as a P frame; if the count of P frames between the next raw infrared data and a previous I frame reaches (or larger than or equal to) the first threshold, the frame type corresponding to the next raw infrared data frame may be determined as an I frame. If the process 900 is performed based on a dynamic GOP, whether a count of pixels where residual data between next raw infrared data and reference data is zero is less than a second threshold may be determined. If the count of pixels where residual data between the next raw infrared data and reference data is zero is less than the second threshold, the frame type corresponding to the next raw infrared data frame may be determined as an I frame; if the count of pixels where residual data between the next raw infrared data and reference data is zero is larger than or equal to the second threshold, the frame type corresponding to the next raw infrared data frame may be determined as a P frame.

It should be noted that the above description of the process 900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 900. In the storing operation, information and/or data (e.g., the target infrared data, the reference data) associated with the infrared data processing may be stored in a storage device (e.g., the storage device 150) disclosed elsewhere in the present disclosure.

FIG. 10 is a schematic diagram illustrating exemplary temperature errors corresponding to different residual thresholds according to some embodiments of the present disclosure. As illustrated in FIG. 10, when a residual threshold is 2, a temperature error corresponding to a temperature range from −30° C. to −20° C. is 0.08, and a temperature error corresponding to a temperature range from −20° C. to −10° C. is 0.07. When the residual threshold is 4, the temperature error corresponding to the temperature range from −30° C. to −20° C. is 0.15, and the temperature error corresponding to the temperature range from −20° C. to −10° C. is 0.13. In some embodiments, a fixed residual threshold may be suitable for a scenario with a relatively small temperature range or a scenario with a known lowest temperature. In the scenario with the known lowest temperature, raw infrared data can be compressed according to a residual threshold corresponding to the lowest temperature and temperature errors corresponding to all temperature ranges can be controlled.

FIG. 11 is a schematic diagram illustrating exemplary residual thresholds corresponding to different temperature errors according to some embodiments of the present disclosure. In some embodiments, in order to control temperature errors corresponding to all temperature ranges at a fixed value or a fixed value range, different residual thresholds may be determined for different temperature ranges. For example, if the temperature error needs to be controlled at 0.02, the residual threshold corresponding to the temperature range from −30° C. to −20° C. may be determined as 0.5, and the residual threshold corresponding to the temperature range from −20° C. to −10° C. may be determined as 0.6. If the temperature error needs to be controlled at 0.05, the residual threshold corresponding to the temperature range from −30° C. to −20° C. may be determined as 1.3, and the residual threshold corresponding to the temperature range from −20° C. to −10° C. may be determined as 1.5. In some embodiments, an adjustable residual threshold may be suitable for a scenario with a relatively large temperature range and can ensure a consistent temperature error in different temperature ranges.

Table 1 is an exemplary table illustrating compression ratios of raw infrared data in a static scenario (e.g., an indoor scenario without a moving object) according to some embodiments of the present disclosure. Table 2 is an exemplary table illustrating compression ratios of raw infrared data in an indoor scenario with a small amount of moving objects according to some embodiments of the present disclosure. Table 3 is an exemplary table illustrating compression ratios of raw infrared data in an outdoor scenario with a small amount of moving objects (e.g., pedestrians, vehicles) according to some embodiments of the present disclosure. Table 4 is an exemplary table illustrating compression ratios of raw infrared data in a highly dynamic scenario (e.g., an outdoor scenario with a large amount of pedestrians and vehicles) according to some embodiments of the present disclosure. As used herein, the compression ratio may refer to a ratio between raw infrared data and compressed raw infrared data. The larger the compression ratio is, the smaller a size of the compressed raw infrared data is. It can be seen from the tables that the raw infrared data are compressed according to different fixed GOPs (e.g., 1, 20, 25, 50) and a dynamic GOP under different gray-level errors (e.g., 0, 2, 4, 8, 16). As used herein, the gray-level error reflects a loss rate associated with lost information of the raw infrared data after being compressed. The smaller the gray-level error is, the less the lost information may be, accordingly, the lower the compression rate may be. Therefore, the gray-level error may be determined according to a predetermined target compression rate or an allowed gray-level error which may be a default setting of the infrared data processing system 100 or may be adjustable under different situations.

TABLE 1

| compression ratios corresponding to different gray-level errors and different GOPs | | | | | |
|---|---|---|---|---|---|
| GOP | 0 | 2 | 4 | 8 | 16 |
| 1 | 3.8 | 3.8 | 3.8 | 3.8 | 3.8 |
| 10 | 11.0 | 26.2 | 28.7 | 28.8 | 28.9 |
| 25 | 13.4 | 47.4 | 67.4 | 69.2 | 69.5 |
| 50 | 14.4 | 61.2 | 117.8 | 131.5 | 132.7 |
| Dynamic | 15.5 | 78.7 | 182.3 | 630.0 | 751.2 |

TABLE 2

| compression ratios corresponding to different gray-level errors and different GOPs | | | | | |
|---|---|---|---|---|---|
| GOP | 0 | 2 | 4 | 8 | 16 |
| 1 | 3.4 | 3.4 | 3.4 | 3.4 | 3.4 |
| 10 | 8.9 | 20.4 | 23.3 | 24.7 | 25.9 |
| 25 | 10.3 | 30.1 | 41.5 | 47.8 | 53.2 |
| 50 | 10.8 | 35.1 | 54.8 | 69.6 | 82.4 |
| Dynamic | 11.4 | 40.4 | 70.6 | 112.6 | 158.6 |

TABLE 3

| compression ratios corresponding to different gray-level errors and different GOPs | | | | | |
|---|---|---|---|---|---|
| GOP | 0 | 2 | 4 | 8 | 16 |
| 1 | 3.2 | 3.2 | 3.2 | 3.2 | 3.2 |
| 10 | 10.5 | 23.5 | 25.9 | 26.6 | 27.3 |
| 25 | 12.7 | 38.1 | 51.2 | 55.1 | 58.7 |
| 50 | 13.7 | 45.7 | 73.2 | 86.0 | 95.5 |
| Dynamic | 14.7 | 53.4 | 89.6 | 134.4 | 210.8 |

TABLE 4

| compression ratios corresponding to different gray-level errors and different GOPs | | | | | |
|---|---|---|---|---|---|
| GOP | 0 | 2 | 4 | 8 | 16 |
| 1 | 2.9 | 2.9 | 2.9 | 2.9 | 2.9 |
| 10 | 6.6 | 13.0 | 15.5 | 17.2 | 18.9 |

TABLE 4-continued compression ratios corresponding to different
gray-level errors and different GOPs

| GOP | 0 | 2 | 4 | 8 | 16 |
|---|---|---|---|---|---|
| 25 | 7.3 | 16.0 | 21.2 | 25.2 | 29.6 |
| 50 | 7.6 | 17.2 | 23.7 | 29.7 | 36.5 |
| Dynamic | 7.8 | 18.3 | 25.8 | 34.7 | 45.8 |

As shown in tables 1 to 4, the compression ratios of raw infrared data may be affected by the GOP, the gray-level error, and the amount of moving objects in the scenarios. For example, for the raw infrared data in a same scenario and compressed based on a same gray-level error, the larger the fixed GOP is, the larger the compression ratio is. Additionally, the compression ratio corresponding to the dynamic GOP is larger than that corresponding to a fixed GOP.

As another example, for a same GOP and a same gray-level error, the raw infrared data in the static scenario may correspond to a largest compression ratio, the raw infrared data in the indoor scenario with a small amount of moving objects or in the outdoor scenario with a small amount of moving objects may correspond to a relatively large compression ratio, and the raw infrared data in the highly dynamic scenario may correspond to a relatively small compression ratio, which is still much larger than a compression ratio corresponding to a normal compression algorithm.

Figure 12:
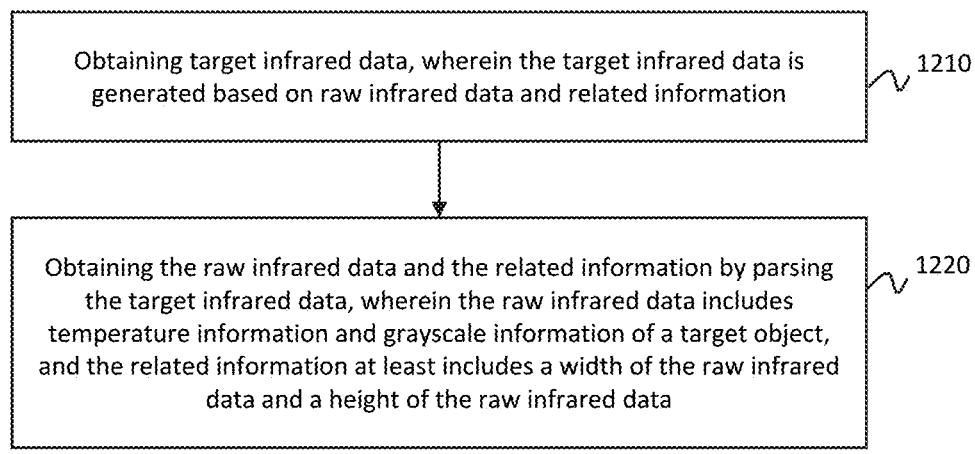
FIG. 12 is a flowchart illustrating an exemplary process for parsing infrared data according to some embodiments of the present disclosure.

FIG. 12 is a flowchart illustrating an exemplary process for parsing infrared data according to some embodiments of the present disclosure. In some embodiments, the process 1200 may be implemented as a set of instructions (e.g., an application) stored in the storage ROM 230 or RAM 240. The processor 220 and/or the modules in FIG. 16 may execute the set of instructions, and when executing the instructions, the processor 220 and/or the modules may be configured to perform the process 1200. The operations of the illustrated process presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1210, target infrared data may be obtained. In some embodiments, the target infrared data may be generated based on raw infrared data and related information. In some embodiments, the target infrared data may be obtained by an infrared data parsing device 1600 (e.g., a second obtaining module 1610) illustrated in FIG. 16.

In 1220, the raw infrared data and the related information may be obtained by parsing the target infrared data. In some embodiments, the raw infrared data and the related information may be obtained by the infrared data parsing device 1600 (e.g., a parsing module 1620) illustrated in FIG. 16. In some embodiments, the raw infrared data may include temperature information and grayscale information of a target object. The related information may at least include a width of the raw infrared data and a height of the raw infrared data.

In some embodiments, to parse the target infrared data, a frame header and an information header of a frame of target infrared data may be read. The frame header may include a frame identifier, a frame size, or the like, or any combination thereof. The information header may include a compression type corresponding to the raw infrared data, a width of the raw infrared data, a height of the raw infrared data, a size of compressed infrared data (also referred to as "size of compressed raw infrared data"), a compression algorithm corresponding to the frame of target infrared data, a generation time of the target infrared data, manufacturer information, or the like, or any combination thereof. By reading the frame header and the information header, the compression type and the compression algorithm corresponding to the frame of target infrared data may be obtained. In some embodiments, the compression type may include a first compression type or a second compression type. Further, compressed infrared data may be obtained by reading a data area of the frame of target infrared data based on the size of compressed infrared data in the information header. In some embodiments, if the compression type corresponding to the raw infrared data is the first compression type, a temperature measurement algorithm in the information header of the target infrared data may be read, and temperature measurement parameters (e.g., an atmospheric temperature, an atmospheric humidity, a temperature measurement distance, an environment type (e.g., indoor environment, outdoor environment)) in the data area of the target infrared data may be read.

In some embodiments, after the compression type, the compression algorithm, and the compressed infrared data are obtained, decompressed infrared data may be obtained by decompressing the compressed infrared data based on the compression algorithm corresponding to the target infrared data. If the compression type is the first compression type, the decompressed compressed infrared data may be determined as first raw infrared data. Further, the first raw infrared data may be determined as reference data for a next target infrared data frame. If the compression type is the second compression type, the decompressed compressed infrared data may be determined as residual data between the raw infrared data and reference data corresponding to a previous target infrared data frame. Then second raw infrared data may be obtained by adding the residual data to the reference data. Further, the second raw infrared data may be determined as updated reference data for a next target infrared data frame.

It should be noted that the above description of the process 1200 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1200. In the storing operation, information and/or data (e.g., the raw infrared data, the reference data) associated with the infrared data parsing may be stored in a storage device (e.g., the storage device 150) disclosed elsewhere in the present disclosure.

Figure 13:
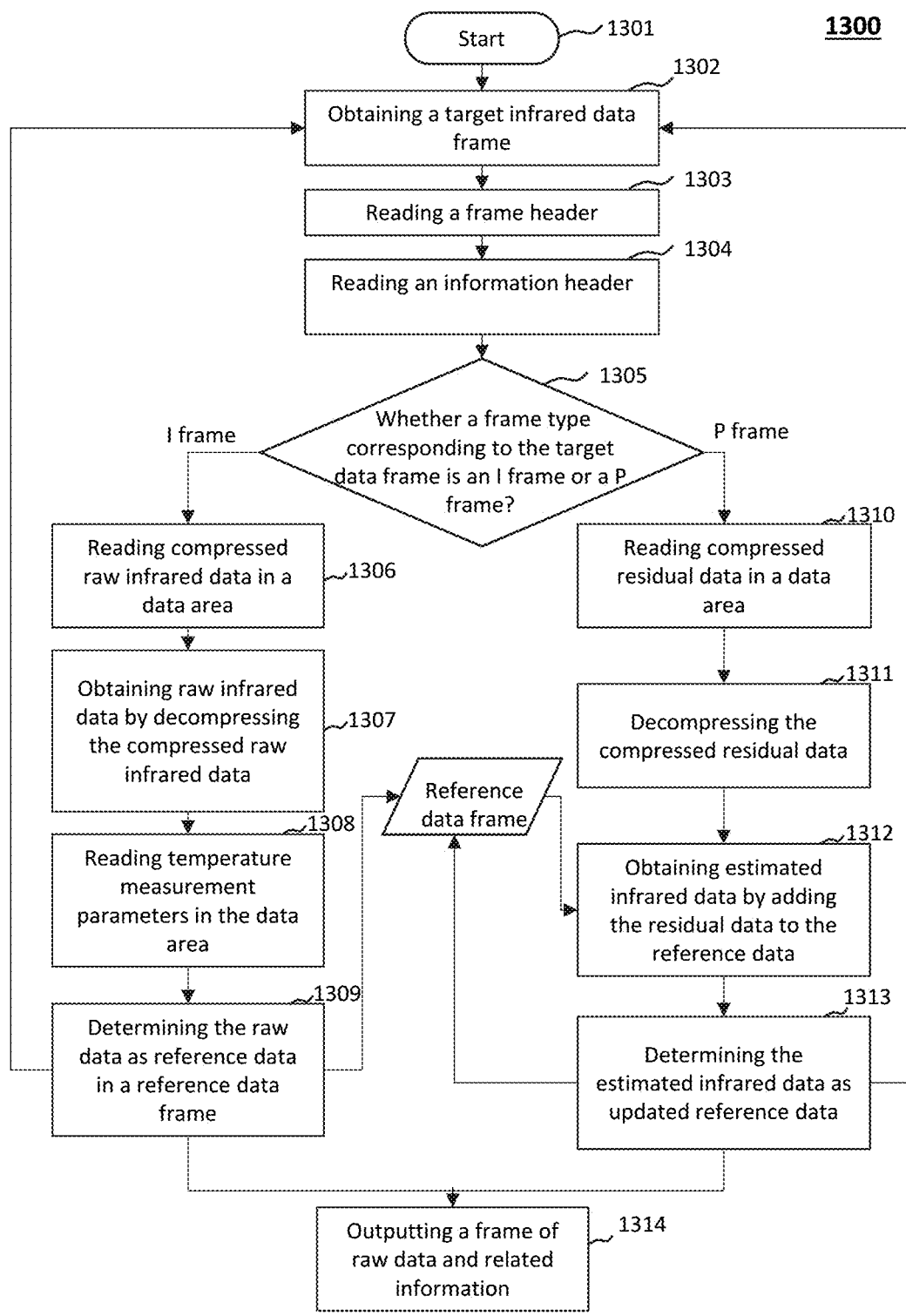
FIG. 13 is a flowchart illustrating another exemplary process for parsing infrared data according to some embodiments of the present disclosure.

FIG. 13 is a flowchart illustrating an exemplary process for parsing infrared data according to some embodiments of the present disclosure. In some embodiments, the process 1300 may be implemented as a set of instructions (e.g., an application) stored in the storage ROM 230 or RAM 240. The processor 220 and/or the modules in FIG. 16 may execute the set of instructions, and when executing the instructions, the processor 220 and/or the modules may be configured to perform the process 1300. The operations of the illustrated process presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting.

In 1301, system initialization may be performed.

In 1302, a target infrared data frame may be obtained. As described in connection with operation 1210, the target infrared data frame may be obtained by the infrared data parsing device 1600 (e.g., the second obtaining module 1610) illustrated in FIG. 16.

In 1303, a frame header of the target infrared data frame may be read. Specifically, the frame header may include a frame identifier and a frame size. Whether the frame identifier is normal may be determined. If the frame identifier is abnormal, an exception may be reported. If the frame identifier is normal, the frame size may be read.

In 1304, an information header of the target infrared data frame may be read. Specifically, a frame type, a width of the raw infrared data, a height of the raw infrared data, a size of compressed infrared data, a compression algorithm corresponding to the target infrared data frame, a generation time of the target infrared data frame, manufacturer information, a temperature measurement algorithm, etc. included in the information header may be obtained.

In 1305, the frame type may be determined.

In 1306, in response to a determination that the frame type is an I frame, compressed infrared data in a data area of the target infrared data frame may be read.

In 1307, decompressed raw infrared data may be obtained by decompressing the compressed raw infrared data based on a decompression algorithm corresponding to the compression algorithm in the information header. The decompressed raw infrared data may be used for temperature measurement, image display or storage, etc.

In 1308, temperature measurement parameters in the data area may be read.

In 1309, the decompressed raw infrared data may be determined as reference data.

In 1310, in response to a determination that the frame type is a P frame, compressed infrared data in a data area of the target infrared data frame may be read. The compressed infrared data refers to compressed residual data between the raw infrared data and reference data corresponding to a previous target infrared data frame.

In 1311, decompressed residual data may be obtained by decompressing the compressed residual data based on a decompression algorithm corresponding to the compression algorithm in the information header.

In 1312, estimated infrared data may be obtained by adding the residual data to the reference data. The estimated infrared data may be further used for temperature measurement, image display or storage.

In 1313, the estimated infrared data may be determined as updated reference data for a next target infrared data frame.

In 1314, a frame of raw infrared data and related information may be output.

It should be noted that the above description of the process 1300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1300. In the storing operation, information and/or data (e.g., the raw infrared data, the reference data) associated with the infrared data parsing may be stored in a storage device (e.g., the storage device 150) disclosed elsewhere in the present disclosure.

Figure 14:
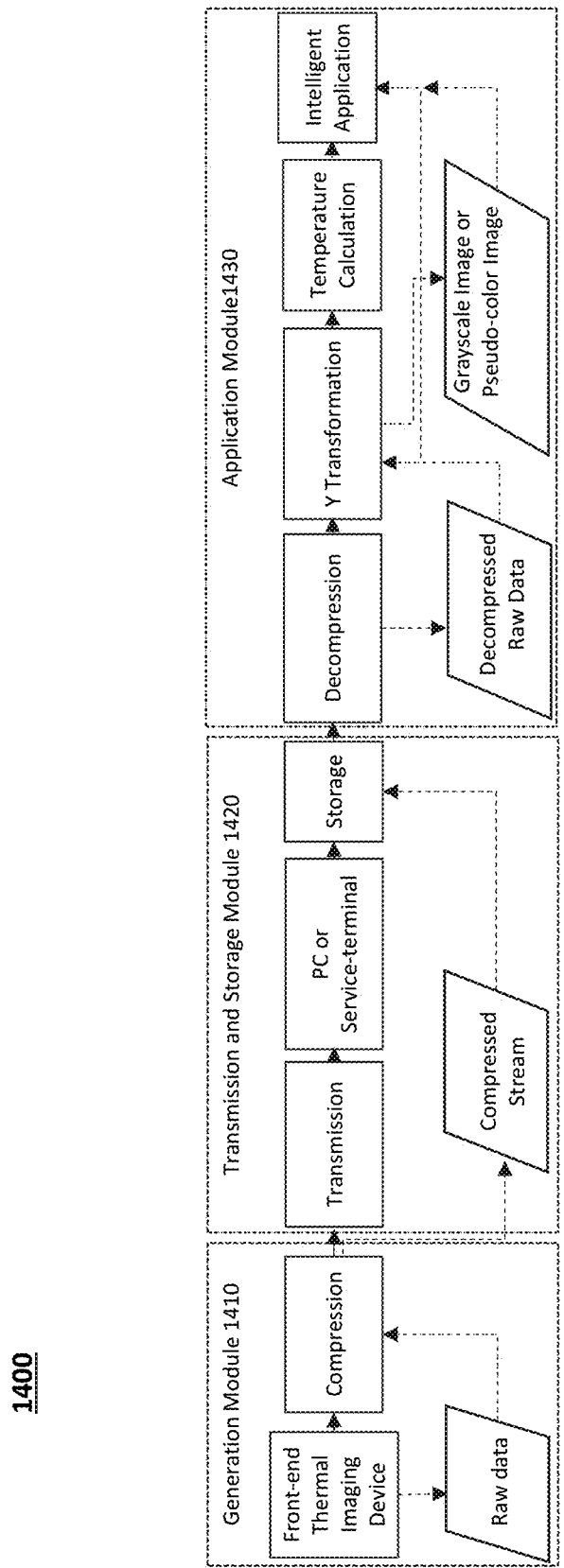
FIG. 14 is a block diagram illustrating an exemplary infrared data processing system according to some embodiments of the present disclosure.

FIG. 14 is a block diagram illustrating an exemplary infrared data processing system according to some embodiments of the present disclosure. In some embodiments, the infrared data processing system 1400 may be implemented on various devices (e.g., the computing device 200 illustrated in FIG. 2, the mobile device 300 illustrated in FIG. 3). As shown in FIG. 14, the infrared data processing system 1400 may include a generation module 1410, a transmission and storage module 1420, and an application module 1430. In some embodiments, one or more modules of the infrared data processing system 1400 may be integrated into the processing device 112.

The generation module 1410 may include a data collection unit and a data compression unit (also referred to as "generation unit"). In some embodiments, the data collection unit may be configured to obtain raw infrared data and related information. The raw infrared data may include temperature information and grayscale information of a target object, and the related information may include a width of the raw infrared data and a height of the raw infrared data. In some embodiments, the data collection unit may include but is not limited to a front-end thermal imaging camera. In some embodiments, the data compression unit may be configured to generate, based on the raw infrared data and the related information, target infrared data. In some embodiments, the target infrared data may include a frame header, an information header, and a data area. In some embodiments, the data compression unit may include but is not limited to a CPU or a GPU.

The transmission and storage module 1420 may be configured to store and transmit the target infrared data. In some embodiments, the transmission and storage module 1420 may include a data transmission unit and a data storage unit. In some embodiments, the data transmission unit may include but is not limited to Ethernet or other transmission devices. In some embodiments, the data storage unit may include but not limited to a hard disk, a flash device, etc.

The application module 1430 may include a data parsing unit, a data conversion unit, a temperature measurement unit, and an intelligent application unit. In some embodiments, the data parsing unit may be configured to obtain the target infrared data and obtain raw infrared data, related information, and temperature measurement parameters by parsing the target infrared data. In some embodiments, the data conversion unit may be configured to convert decompressed raw infrared data into a visible image. For example, the data conversion unit may convert the raw infrared data into a visible grayscale image in 8-bit for display by using a conversion algorithm. Further, the data conversion unit may convert the visible grayscale image in 8-bit into a pseudo-color image for display by using a pseudo-color algorithm. In some embodiments, the temperature measurement unit may be configured to select a target region in the visible image and determine temperature information (e.g., a highest temperature, a lowest temperature, an average temperature, a temperature distribution) of the target region according to a temperature measurement algorithm based on the temperature measurement parameters. The target region may include a point, a line, a region, a polygon, an ellipse, or the like, or any combination thereof. In some embodiments, the intelligent application unit may be configured to perform a data analysis based on the visible image.

In some embodiments, the modules in the infrared data processing system 1400 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the application module 1430 may also include a display unit, which may be configured to display the visible image and/or the temperature information of the target region for a user.

FIG. 15 is a block diagram illustrating an exemplary infrared data generation device according to some embodiments of the present disclosure. In some embodiments, the infrared data generation device 1500 may be implemented on various devices (e.g., the computing device 200 illustrated in FIG. 2, the mobile device 300 illustrated in FIG. 3). As shown in FIG. 15, the infrared data generation device 1500 may include a first obtaining module 1510 and a first generation module 1520. In some embodiments, one or more modules (e.g., the first obtaining module 1510, the first generation module 1520) of the infrared data generation device 1500 may be integrated into the processing device 112.

The first obtaining module 1510 may be configured to obtain raw infrared data and related information. In some embodiments, the raw infrared data may include temperature information and grayscale information of a target object. And the related information may include a width of the raw infrared data and a height of the raw infrared data.

The first generation module 1520 may be configured to generate target infrared data based on the raw infrared data and the related information. In some embodiments, the target infrared data may include a frame header, an information header, and a data area.

In some embodiments, the modules in the infrared data generation device 1500 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 16:
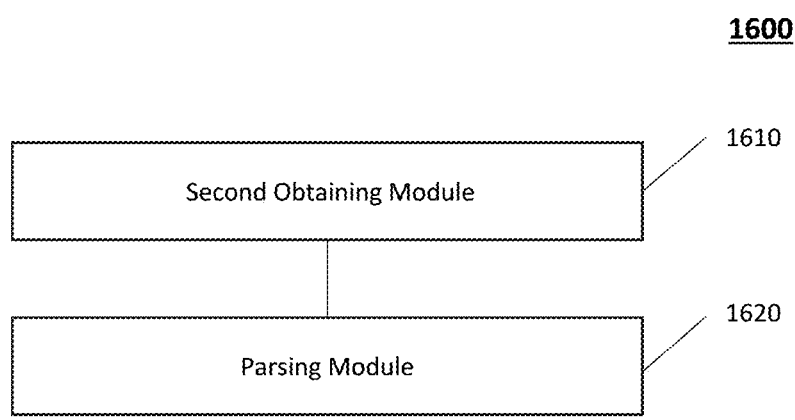
FIG. 16 is a block diagram illustrating an exemplary infrared data parsing device according to some embodiments of the present disclosure.

FIG. 16 is a block diagram illustrating an exemplary infrared data parsing device according to some embodiments of the present disclosure. In some embodiments, the infrared data parsing device 1600 may be implemented on various devices (e.g., the computing device 200 illustrated in FIG. 2, the mobile device 300 illustrated in FIG. 3). As shown in FIG. 16, the infrared data parsing device 1600 may include a second obtaining module 1610 and a parsing module 1620. In some embodiments, one or more modules (e.g., the second obtaining module 1610, the parsing module 1620) of the infrared data parsing device 1600 may be integrated into the processing device 112.

The second obtaining module 1610 may be configured to obtain target infrared data. In some embodiments, the target infrared data may be generated based on raw infrared data and related information.

The parsing module 1620 may be configured to obtain the raw infrared data and the related information by parsing the target infrared data. In some embodiments, the raw infrared data may include temperature information and grayscale information of a target object. In some embodiments, the related information may include a width of the raw infrared data and a height of the raw infrared data.

In some embodiments, the modules in the infrared data parsing device 1600 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

Figure 17:
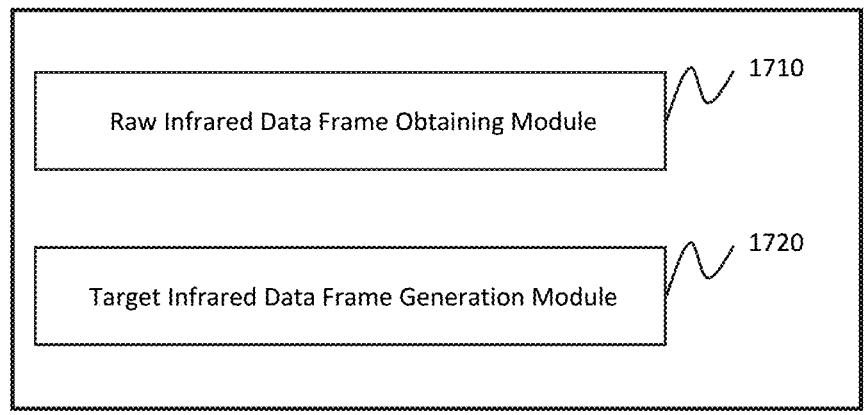
FIG. 17 is a block diagram illustrating an exemplary processing device according to some embodiments of the present disclosure.

FIG. 17 is a block diagram illustrating an exemplary processing device according to some embodiments of the present disclosure. In some embodiments, the processing device 112 may be configured to process infrared data. In some embodiments, the processing device 112 may be implemented on various devices (e.g., the computing device 200 illustrated in FIG. 2, the mobile device 300 illustrated in FIG. 3). As shown in FIG. 17, the processing device 112 may include a raw infrared data frame obtaining module 1710 and a target infrared data frame generation module 1720.

The raw infrared data frame obtaining module 1710 may be configured to obtain one or more raw infrared data frames related to a target object.

As described in connection with operation 410, the one or more raw infrared data frames may be acquired by an acquisition device (e.g., the acquisition device 130). The raw infrared data frame obtaining module 1710 may obtain the one or more raw infrared data frames from the acquisition device directly. In some embodiments, the one or more raw infrared data frames acquired by the acquisition device may be stored in a storage device (e.g., the storage device 150). The raw infrared data frame obtaining module 1710 may obtain the one or more raw infrared data frames from the storage device.

In some embodiments, each of the one or more raw infrared data frames may include raw infrared data including raw temperature information and raw grayscale information of the target object.

The target infrared data frame generation module 1720 may be configured to generate one or more target infrared data frames corresponding to the one or more raw infrared data frames based on the raw infrared data.

In some embodiments, each of the one or more target infrared data frames may include a frame header, an information header, and a data area. The frame header may include a frame identifier, a frame size, or the like, or any combination thereof. More descriptions regarding the frame header, the information header, and the data area may be found elsewhere in the present disclosure (e.g., FIGS. 4-6 and the descriptions thereof).

In some embodiments, for at least one of the one or more target infrared data frames, the data area may include substantially complete raw temperature information and substantially complete raw grayscale information. Accordingly, the complete raw temperature information and the complete raw grayscale information can be obtained by parsing the target infrared data frame.

In some embodiments, to generate the one or more target infrared data frames corresponding to the one or more raw infrared data frames based on the raw infrared data, for each of the one or more raw infrared data frames, the target infrared data frame generation module 1720 may be configured to determine a compression operation to be performed on the raw infrared data in the raw infrared data frame. In some embodiments, the compression operation may include a first compression operation or a second compression operation. Further, the target infrared data frame generation module 1720 may be configured to determine the target infrared data frame corresponding to the raw infrared data frame by performing the compression operation on the raw infrared data.

Specifically, in response to a determination that the compression operation to be performed on the raw infrared data is the first compression operation, the target infrared data frame generation module 1720 may obtain compressed raw infrared data by performing the first compression operation (e.g., a lossless compression) on the raw infrared data. Further, the target infrared data frame generation module 1720 may determine a first type of target infrared data frame (also referred to as an "I frame") based on the compressed raw infrared data. In some embodiments, the target infrared data frame generation module 1720 may further determine the raw infrared data in the raw infrared data frame as reference data for a next raw infrared data frame.

In response to a determination that the compression operation to be performed on the raw infrared data is the second compression operation, the target infrared data frame generation module 1720 may obtain residual data between the raw infrared data in the raw infrared data frame and reference data corresponding to a previous raw infrared data frame (also can be considered as "reference data corresponding to a previous target infrared data frame"). Then the target infrared data frame generation module 1720 may obtain compressed residual data by performing the second compression operation (e.g., a lossless compression or a lossy compression) on the residual data. Further, the target infrared data frame generation module 1720 may determine a second type of target infrared data frame (also referred to as a "P frame") based on the compressed residual data. In some embodiments, the target infrared data frame generation module 1720 may further determine the residual data plus the reference data as updated reference data for a next raw infrared data frame.

In some embodiments, to obtain the residual data between the raw infrared data in the raw infrared data frame and the reference data corresponding to a previous raw infrared data frame, for each of a plurality of pixels in the raw infrared data, the target infrared data frame generation module 1720 may determine a difference value between the pixel and a corresponding pixel in the reference data. Further, the target infrared data frame generation module 1720 may determine whether the difference value (e.g., an absolute value of the difference value) is less than a first preset threshold. In response to a determination that the difference value is less than the first preset threshold, the target infrared data frame generation module 1720 may set the difference value as zero. In response to a determination that the difference value is larger than or equal to the first preset threshold, the target infrared data frame generation module 1720 may keep the difference value unchanged. Furthermore, the target infrared data frame generation module 1720 may determine the difference values corresponding to the plurality of pixels as the residual data.

In some embodiments, to determine the compression operation to be performed on the raw infrared data in the raw infrared data frame, the target infrared data frame generation module 1720 may determine a count of frames between the raw infrared data frame and a previous first type of target infrared data frame (i.e., a previous I frame). Further, the target infrared data frame generation module 1720 may determine whether the count of frames is less than a second preset threshold. In response to a determination that the count of frames is less than the second preset threshold, the target infrared data frame generation module 1720 may determine to perform the second compression operation on the residual data. In response to a determination that the count of frames reaches (or larger than or equal to) the second preset threshold, the target infrared data frame generation module 1720 may determine to perform the first compression operation on the raw infrared data.

In some embodiments, to determine the compression operation to be performed on the raw infrared data in the raw infrared data frame, the target infrared data frame generation module 1720 may determine a count of pixels with difference values not being set as zeros in residual data between the raw infrared data and reference data (or determine a count of pixels with difference values set as zeros). In some embodiments, as described above, different values in the residual data less than the first preset threshold may be set as zeros. Further, the target infrared data frame generation module 1720 may determine whether the count of pixels with difference values not being set as zeros is larger than a third preset threshold (or determine whether the count of pixels with difference values set as zeros is less than a threshold). In response to a determination that the count of pixels is larger than the third preset threshold, the target infrared data frame generation module 1720 may determine to perform the first compression operation on a next raw infrared data frame. In response to a determination that the count of pixels is less than or equal to the third preset threshold, the target infrared data frame generation module 1720 may determine to perform the second compression operation on the next raw infrared data frame.

In some embodiments, if the raw infrared data frame is the first frame in the one or more raw infrared data frames, the target infrared data frame generation module 1720 may determine to perform the first compression operation on the raw infrared data.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 112 may include a storage module (not shown) used to store information and/or data (e.g., the raw infrared data frames, the target infrared data frames, the reference data) associated with the infrared data processing.

Figure 18:
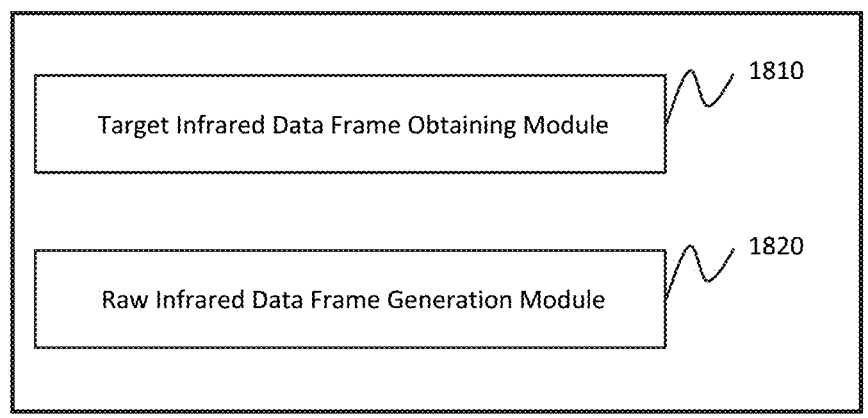
FIG. 18 is a block diagram illustrating another exemplary processing device according to some embodiments of the present disclosure.

FIG. 18 is a block diagram illustrating another exemplary processing device according to some embodiments of the present disclosure. In some embodiments, the processing device 112 may be configured to parse infrared data. In some embodiments, the processing device 112 may be implemented on various devices (e.g., the computing device 200 illustrated in FIG. 2, the mobile device 300 illustrated in FIG. 3). As shown in FIG. 18, the processing device 112 may include a target infrared data frame obtaining module 1810 and a raw infrared data frame generation module 1820.

The target infrared data frame obtaining module 1810 may be configured to obtain one or more target infrared data frames related to a target object. In some embodiments, each of the one or more target infrared data frames may include compressed infrared data.

In some embodiments, each of the one or more target infrared data frames may include a frame header, an information header, and a data area. More descriptions regarding the frame header, the information header, and the data area may be found elsewhere in the present disclosure (e.g., FIGS. 4-6 and the descriptions thereof).

In some embodiments, for at least one of the one or more target infrared data frames, the data area may include substantially complete raw temperature information and substantially complete raw grayscale information of the target object. In some embodiments, the substantially complete raw temperature information and substantially complete raw grayscale information of the target object may be used to generate a visible image (e.g., a grayscale image, a pseudo-color image) related to the target object and/or determine temperature information of a target region in the visible image.

The raw infrared data frame generation module 1820 may be configured to generate one or more raw infrared data frames corresponding to the one or more target infrared data frames based on the compressed infrared data.

In some embodiments, to generate the one or more raw infrared data frames corresponding to the one or more target infrared data frames based on the target infrared data, for each of the one or more target infrared data frames, the raw infrared data frame generation module 1820 may be configured to determine a compression operation performed on raw infrared data corresponding to the target infrared data frame (i.e., determine whether the target infrared data frame is an I frame or a P frame). In some embodiments, the compression operation may include a first compression operation or a second compression operation. Further, the raw infrared data frame generation module 1820 may be configured to generate the raw infrared data frame corresponding to the target infrared data frame by parsing the compressed infrared data based on the compression operation performed on the raw infrared data.

Specifically, the raw infrared data frame generation module 1820 may obtain the compression operation performed on the raw infrared data from the information header of the target infrared data frame (e.g., read the information header). Further, in response to a determination that the compression operation performed on the raw infrared data is the first compression operation, the raw infrared data frame generation module 1820 may obtain first decompressed infrared data by performing a first decompression operation on the compressed infrared data. Further, the raw infrared data frame generation module 1820 may determine a first type of raw infrared data frame based on the first decompressed infrared data. In some embodiments, the raw infrared data frame generation module 1820 may further determine the raw infrared data in the first type of raw infrared data frame as reference data for a next target infrared data frame.

In response to a determination that the compression operation performed on the raw infrared data is the second compression operation, the raw infrared data frame generation module 1820 may obtain second decompressed infrared data by performing a second decompression operation on the compressed infrared data. Further, the raw infrared data frame generation module 1820 may determine the second decompressed raw infrared data as decompressed residual data between the raw infrared data in the raw infrared data frame and reference data corresponding to a previous target infrared data frame. Furthermore, the raw infrared data frame generation module 1820 may determine a second type of raw infrared data frame based on the decompressed residual data. In some embodiments, the raw infrared data frame generation module 1820 may further designate the decompressed residual data plus the reference data as updated reference data for a next target infrared data frame.

The modules in the processing device 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the processing device 112 may include a storage module (not shown) used to store information and/or data (e.g., target infrared data frames, the raw infrared data frames, the reference data) associated with the infrared data processing.

Figure 19:
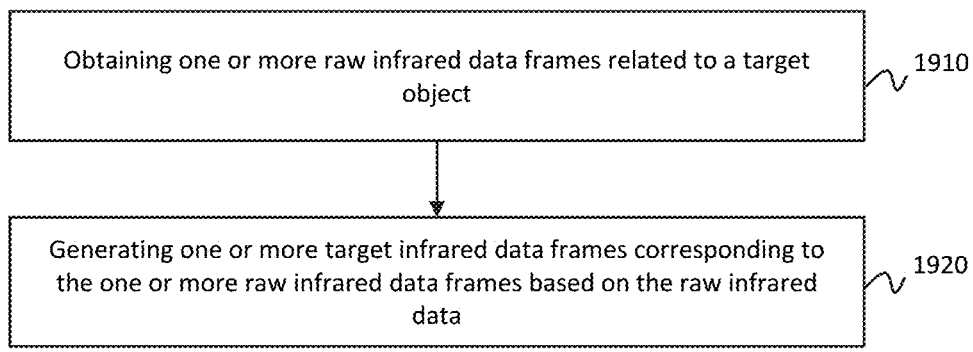
FIG. 19 is a flowchart illustrating an exemplary process for processing infrared data according to some embodiments of the present disclosure.

FIG. 19 is a flowchart illustrating an exemplary process for processing infrared data according to some embodiments of the present disclosure. In some embodiments, the process 1900 may be implemented as a set of instructions (e.g., an application) stored in the storage ROM 230 or RAM 240. The processor 220 and/or the modules in FIG. 17 may execute the set of instructions, and when executing the instructions, the processor 220 and/or the modules may be configured to perform the process 1900. The operations of the illustrated process presented below are intended to be illustrative. In some embodiments, the process 1900 may be accomplished with one or more additional operations not described, and/or without one or more of the operations discussed. Additionally, the order in which the operations of the process 1900 as illustrated in FIG. 19 and described below is not intended to be limiting.

In 1910, the processing device 112 (e.g., the raw infrared data frame obtaining module 1710) may obtain one or more raw infrared data frames related to a target object.

As described in connection with operation 410, the one or more raw infrared data frames may be acquired by an acquisition device (e.g., the acquisition device 130). The processing device 112 may obtain the one or more raw infrared data frames from the acquisition device directly. In some embodiments, the one or more raw infrared data frames acquired by the acquisition device may be stored in a storage device (e.g., the storage device 150). The processing device 112 may obtain the one or more raw infrared data frames from the storage device.

In some embodiments, each of the one or more raw infrared data frames may include raw infrared data including raw temperature information and raw grayscale information of the target object.

In 1920, the processing device 112 (e.g., the target infrared data frame generation module 1720) may generate one or more target infrared data frames corresponding to the one or more raw infrared data frames based on the raw infrared data.

In some embodiments, each of the one or more target infrared data frames may include a frame header, an information header, and a data area. The frame header may include a frame identifier, a frame size, or the like, or any combination thereof. The information header may include a compression type of a compression operation performed on the raw infrared data, a width of the raw infrared data frame, a height of the raw infrared data frame, a size of compressed infrared data frame, a compression algorithm of the compression operation, a temperature measurement algorithm used for converting the raw infrared data into temperature information, or the like, or any combination thereof. Alternatively or additionally, the information header may also include other information such as a generation time of the target infrared data frame, manufacturer information, etc. The data area may include the compressed infrared data, temperature measurement parameters, or the like, or any combination thereof. Exemplary temperature measurement parameters may include an atmospheric temperature, an atmospheric humidity, a temperature measurement distance, an environment type (e.g., indoor environment, outdoor environment)), or the like, or any combination thereof. More descriptions regarding the frame header, the information header, and the data area may be found elsewhere in the present disclosure (e.g., FIGS. 4-6 and the descriptions thereof).

In some embodiments, for at least one of the one or more target infrared data frames, the data area may include substantially complete raw temperature information and substantially complete raw grayscale information. Accordingly, the complete raw temperature information and the complete raw grayscale information can be obtained by parsing the target infrared data frame.

In some embodiments, to generate the one or more target infrared data frames corresponding to the one or more raw infrared data frames based on the raw infrared data, for each of the one or more raw infrared data frames, the processing device 112 may determine a compression operation to be performed on the raw infrared data in the raw infrared data frame. In some embodiments, the compression operation may include a first compression operation or a second compression operation. Further, the processing device 112 may determine the target infrared data frame corresponding to the raw infrared data frame by performing the compression operation on the raw infrared data.

Specifically, in response to a determination that the compression operation to be performed on the raw infrared data is the first compression operation, the processing device 112 may obtain compressed raw infrared data by performing the first compression operation on the raw infrared data. For example, the processing device 112 may obtain the compressed raw infrared data by performing a lossless compression on the raw infrared data. That is, the compressed raw infrared data includes substantially complete raw temperature information and substantially complete raw grayscale information. Further, the processing device 112 may determine a first type of target infrared data frame (also referred to as an "I frame") based on the compressed raw infrared data. For example, the processing device 112 may determine the compressed raw infrared data as target infrared data in the first type of target infrared data frame. More descriptions regarding the I frame may be found elsewhere in the present disclosure (e.g., FIG. 5 and the description thereof). In some embodiments, the processing device 112 may further determine the raw infrared data in the raw infrared data frame as reference data for a next raw infrared data frame.

In response to a determination that the compression operation to be performed on the raw infrared data is the second compression operation, the processing device 112 may obtain residual data between the raw infrared data in the raw infrared data frame and reference data corresponding to a previous raw infrared data frame (also can be considered as "reference data corresponding to a previous target infrared data frame"). Then the processing device 112 may obtain compressed residual data by performing the second compression operation on the residual data. For example, the processing device 112 may obtain the compressed residual data by performing a lossless compression (or a lossy compression) on the residual data. Further, the processing device 112 may determine a second type of target infrared data frame (also referred to as a "P frame") based on the compressed residual data. More descriptions regarding the P frame may be found elsewhere in the present disclosure (e.g., FIG. 6 and the description thereof). In some embodiments, the processing device 112 may further determine the residual data plus the reference data as updated reference data for a next raw infrared data frame. In the present disclosure, the reference data may be continuously updated so as to reduce a size of the residual data step by step, thereby improving accuracy of the target infrared data.

In some embodiments, to obtain the residual data between the raw infrared data in the raw infrared data frame and the reference data corresponding to a previous raw infrared data frame, for each of a plurality of pixels in the raw infrared data, the processing device 112 may determine a difference value between the pixel and a corresponding pixel in the reference data. For example, the processing device 112 may determine the difference value by subtracting a pixel value of the pixel from a pixel value of a pixel at a same position in the reference data. Further, the processing device 112 may determine whether the difference value (e.g., an absolute value of the difference value) is less than a first preset threshold. In response to a determination that the difference value is less than the first preset threshold, the processing device 112 may set the difference value as zero. In response to a determination that the difference value is larger than or equal to the first preset threshold, the processing device 112 may keep the difference value unchanged. Furthermore, the processing device 112 may determine the difference values corresponding to the plurality of pixels as the residual data.

In some embodiments, to determine the compression operation to be performed on the raw infrared data in the raw infrared data frame, the processing device 112 may determine a count of frames between the raw infrared data frame and a previous first type of target infrared data frame (i.e., a previous I frame). Further, the processing device 112 may determine whether the count of frames is less than a second preset threshold. In response to a determination that the count of frames is less than the second preset threshold, the processing device 112 may determine to perform the second compression operation on the residual data. In response to a determination that the count of frames reaches (or larger than or equal to) the second preset threshold, the processing device 112 may determine to perform the first compression operation on the raw infrared data.

In some embodiments, to determine the compression operation to be performed on the raw infrared data in the raw infrared data frame, the processing device 112 may determine a count of pixels with difference values not being set as zeros in residual data between the raw infrared data and reference data (or determine a count of pixels with difference values set as zeros). In some embodiments, as described above, different values in the residual data less than the first preset threshold may be set as zeros. Further, the processing device 112 may determine whether the count of pixels with difference values not being set as zeros is larger than a third preset threshold (or determine whether the count of pixels with difference values set as zeros is less than a threshold). In response to a determination that the count of pixels is larger than the third preset threshold, the processing device 112 may determine to perform the first compression operation on a next raw infrared data frame. In response to a determination that the count of pixels is less than or equal to the third preset threshold, the processing device 112 may determine to perform the second compression operation on the next raw infrared data frame.

In some embodiments, if the raw infrared data frame is the first frame in the one or more raw infrared data frames, the processing device 112 may determine to perform the first compression operation on the raw infrared data.

It should be noted that the above description of the process 1900 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 1900. In the storing operation, information and/or data (e.g., the raw infrared data frames, the target infrared data frames, the reference data) may be stored in a storage device (e.g., the storage device 150) disclosed elsewhere in the present disclosure.

Figure 20:
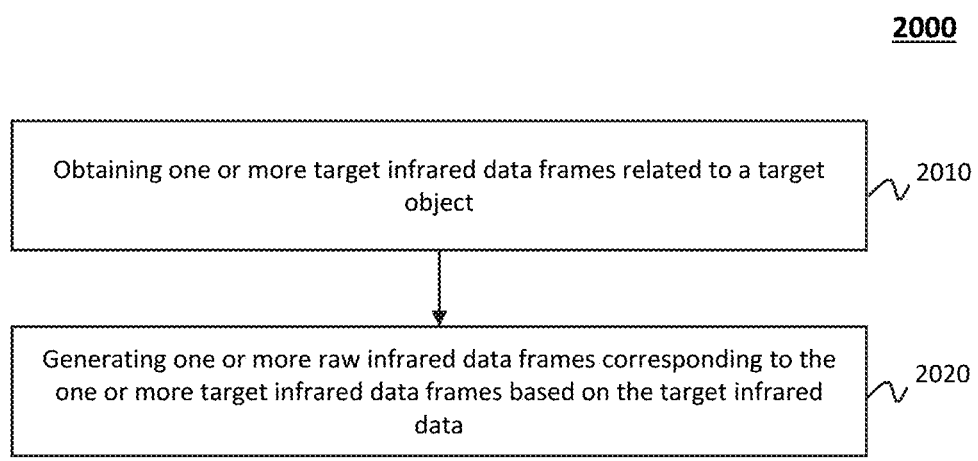
FIG. 20 is a flowchart illustrating an exemplary process for parsing infrared data according to some embodiments of the present disclosure.

FIG. 20 is a flowchart illustrating an exemplary process for parsing infrared data according to some embodiments of the present disclosure. In some embodiments, the process 2000 may be implemented as a set of instructions (e.g., an application) stored in the storage ROM 230 or RAM 240. The processor 220 and/or the modules in FIG. 18 may execute the set of instructions, and when executing the instructions, the processor 220 and/or the modules may be configured to perform the process 2000. The operations of the illustrated process presented below are intended to be illustrative. In some embodiments, the process 2000 may be accomplished with one or more additional operations not described, and/or without one or more of the operations discussed. Additionally, the order in which the operations of the process 2000 as illustrated in FIG. 20 and described below is not intended to be limiting.

In 2010, the processing device 112 (e.g., the target infrared data frame obtaining module 1810) may obtain one or more target infrared data frames related to a target object. In some embodiments, each of the one or more target infrared data frames may include compressed infrared data.

In some embodiments, each of the one or more target infrared data frames may include a frame header, an information header, and a data area. The frame header may include a frame identifier, a frame size, or the like, or any combination thereof. The information header may include a compression type of a compression operation performed on raw infrared data, a width of a raw infrared data frame corresponding to the target infrared data frame, a height of the raw infrared data frame, a size of compressed infrared data frame, a compression algorithm of the compression operation, a temperature measurement algorithm used for converting the raw infrared data into temperature information, or the like, or any combination thereof. Alternatively or additionally, the information header may also include other information such as a generation time of the target infrared data frame, manufacturer information, etc. The data area may include the compressed infrared data, temperature measurement parameters, or the like, or any combination thereof. Exemplary temperature measurement parameters may include an atmospheric temperature, an atmospheric humidity, a temperature measurement distance, an environment type (e.g., indoor environment, outdoor environment)), or the like, or any combination thereof. More descriptions regarding the frame header, the information header, and the data area may be found elsewhere in the present disclosure (e.g., FIGS. 4-6 and the descriptions thereof).

In some embodiments, for at least one of the one or more target infrared data frames, the data area may include substantially complete raw temperature information and substantially complete raw grayscale information of the target object. In some embodiments, the substantially complete raw temperature information and substantially complete raw grayscale information of the target object may be used to generate a visible image (e.g., a grayscale image, a pseudo-color image) related to the target object and/or determine temperature information of a target region in the visible image.

In 2020, the processing device 112 (e.g., the raw infrared data frame generation module 1820) may generate one or more raw infrared data frames corresponding to the one or more target infrared data frames based on the compressed infrared data.

In some embodiments, to generate the one or more raw infrared data frames corresponding to the one or more target infrared data frames based on the target infrared data, for each of the one or more target infrared data frames, the processing device 112 may determine a compression operation performed on raw infrared data corresponding to the target infrared data frame (i.e., determine whether the target infrared data frame is an I frame or a P frame). In some embodiments, the compression operation may include a first compression operation or a second compression operation. Further, the processing device 112 may generate the raw infrared data frame corresponding to the target infrared data frame by parsing the compressed infrared data based on the compression operation performed on the raw infrared data.

Specifically, the processing device 112 may obtain the compression operation performed on the raw infrared data from the information header of the target infrared data frame (e.g., read the information header). Further, in response to a determination that the compression operation performed on the raw infrared data is the first compression operation, the processing device 112 may obtain first decompressed infrared data by performing a first decompression operation on the compressed infrared data. For example, if the first compression operation is performed using a lossless compression algorithm, the processing device 112 may perform the first decompression operation on the compressed infrared data using a decompression algorithm corresponding to the lossless compression algorithm. Further, the processing device 112 may determine a first type of raw infrared data frame based on the first decompressed infrared data. For example, the processing device 112 may determine the first decompressed infrared data as raw infrared data in the first type of raw infrared data frame. In some embodiments, the processing device 112 may further determine the raw infrared data in the first type of raw infrared data frame as reference data for a next target infrared data frame.

In response to a determination that the compression operation performed on the raw infrared data is the second compression operation, the processing device 112 may obtain second decompressed infrared data by performing a second decompression operation on the compressed infrared data. Further, the processing device 112 may determine the second decompressed raw infrared data as decompressed residual data between the raw infrared data in the raw infrared data frame and reference data corresponding to a previous target infrared data frame. Furthermore, the processing device 112 may determine a second type of raw infrared data frame based on the decompressed residual data. For example, the processing device 112 may determine the decompressed residual data plus the reference data as raw infrared data in the second type of raw infrared data frame. In some embodiments, the processing device 112 may further designate the decompressed residual data plus the reference data as updated reference data for a next target infrared data frame.

It should be noted that the above description of the process 2000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 2000. In the storing operation, information and/or data (e.g., the target infrared data frames, the raw infrared data frames, the reference data) may be stored in a storage device (e.g., the storage device 150) disclosed elsewhere in the present disclosure.

In some embodiments, the present disclosure may also provide an infrared data format. The infrared data format may include a first data format and a second data format.

In some embodiments, the first data format may include a first frame header, a first information header, and a first data area. The first frame header may include a first frame identifier, a first frame size, or the like, or any combination thereof. The first information header may include a first frame type, a first image width, a first image height, a first data size, a first generation time, a first temperature measurement algorithm, a first compression algorithm, or the like, or any combination thereof. The first data area may include compressed first infrared data, first temperature measurement parameters, or the like, or any combination thereof.

In some embodiments, the second data format may include a second frame header, a second information header, and a second data area. The second frame header may include a second frame identifier, a second frame size, or the like, or any combination thereof. The second information header may include a second frame type, a second image width, a second image height, a second data size, a second generation time, a second compression algorithm, or the like, or any combination thereof. The second data area may include compressed first infrared residual data.

In some embodiments, the present disclosure may also provide a storage medium with computer programs stored thereon. When the computer programs are executed, a process (e.g., process 400, process 900, process 1200, process 1300, process 1900, process 2000) described elsewhere in the present disclosure may be performed. In some embodiments, the storage medium may include but is not limited to various media that can store computer programs, such as a USB flash disk, a read-only memory (ROM), a random access memory (RAM), a removable hard disk, a magnetic disk, an optical disk, or the like, or any combination thereof.

In some embodiments, the present disclosure may also provide an electronic device including a storage and a processor. The storage may store computer programs, and the processor may be configured to execute the computer programs to perform a process (e.g., process 400, process 900, process 1200, process 1300, process 1900, process 2000) described elsewhere in the present disclosure. In some embodiments, the electronic device may also include a transmission device and an I/O device. The transmission device and the I/O device may be connected to the processor.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction performing system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system for processing infrared data, comprising:
at least one storage device including a set of instructions; and
at least one processor in communication with the at least one storage device, wherein when executing the set of instructions, the at least one processor is directed to cause the system to:
obtain one or more raw infrared data frames related to a target object, wherein each of the one or more raw infrared data frames includes raw infrared data; and
generate one or more target infrared data frames corresponding to the one or more raw infrared data frames based on the raw infrared data according to operations including:
for each of the one or more raw infrared data frames,
determining a compression operation to be performed on the raw infrared data in the raw infrared data frame, the compression operation including a first compression operation or a second compression operation; and
determining the target infrared data frame corresponding to the raw infrared data frame by performing the compression operation on the raw infrared data, the operations further including:
determining a count of pixels with difference values not being set as zeros in residual data between the raw infrared data and reference data, wherein the different values in the residual data less than a first preset threshold are set as zeros;
determining whether the count of pixels is larger than a third preset threshold;
in response to a determination that the count of pixels is larger than the third preset threshold, performing the first compression operation on a next raw infrared data frame among the one or more raw infrared data frames; or
in response to a determination that the count of pixels is less than or equal to the third preset threshold, performing the second compression operation on the next raw infrared data frame.

2. The system of claim 1, wherein to determine the target infrared data frame corresponding to the raw infrared data frame by performing the compression operation on the raw infrared data, the at least one processor is directed to cause the system to:
in response to a determination that the compression operation to be performed on the raw infrared data is the first compression operation,
obtain compressed raw infrared data by performing the first compression operation on the raw infrared data; and determine a first type of target infrared data frame based on the compressed raw infrared data.

3. The system of claim 2, wherein the at least one processor is directed to cause the system further to:
determine the raw infrared data in the raw infrared data frame as reference data for the next raw infrared data frame.

4. The system of claim 2, wherein to determine the target infrared data frame corresponding to the raw infrared data frame by performing the compression operation on the raw infrared data, the at least one processor is directed to cause the system to:
in response to a determination that the compression operation to be performed on the raw infrared data is the second compression operation,
obtain residual data between the raw infrared data in the raw infrared data frame and reference data corresponding to a previous raw infrared data frame;
obtain compressed residual data by performing the second compression operation on the residual data; and
determine a second type of target infrared data frame based on the compressed residual data.

5. The system of claim 4, wherein the at least one processor is directed to cause the system further to:
designate the residual data plus the reference data as updated reference data for a next raw infrared data frame.

6. The system of claim 4, wherein to obtain the residual data between the raw infrared data and reference data corresponding to a previous raw infrared data frame, the at least one processor is directed to cause the system to:
for each of a plurality of pixels in the raw infrared data, determine a difference value between the pixel and a corresponding pixel in the reference data;
determine whether the difference value is less than a first preset threshold;
in response to a determination that the difference value is less than the first preset threshold, set the difference value as zero; and
in response to a determination that the difference value is larger than or equal to the first preset threshold, keep the difference value unchanged; and
determine the difference values corresponding to the plurality of pixels as the residual data.

7. The system of claim 1, wherein to determine the compression operation to be performed on the raw infrared data, the at least one processor is directed to cause the system further to:
determine a count of frames between the raw infrared data frame and a previous first type of target infrared data frame;
determine whether the count of frames is less than a second preset threshold;
in response to a determination that the count of frames is larger than or equal to the second preset threshold, determine to perform the first compression operation on the raw infrared data; or
in response to a determination that the count of frames is less than the second preset threshold, determine to perform the second compression operation on the residual data.

8. The system of claim 1, wherein the raw infrared data includes raw temperature information and raw grayscale information of the target object.

9. The system of claim 1, each of the one or more target infrared data frames includes a frame header, an information header, and a data area; and
for at least one of the one or more target infrared data frames, the data area includes substantially complete raw temperature information and substantially complete raw grayscale information.

10. The system of claim 9, wherein
the frame header includes at least one of a frame identifier or a frame size;
the information header includes at least one of a compression type of a compression operation performed on raw infrared data, a width of a raw infrared data frame, a height of the raw infrared data frame, a size of compressed infrared data frame, a compression algorithm of the compression operation, or a temperature measurement algorithm used for converting the raw infrared data into temperature information; and
the data area includes at least one of the compressed infrared data or temperature measurement parameters.

11. A system for parsing infrared data, comprising:
at least one storage device including a set of instructions; and
at least one processor in communication with the at least one storage device, wherein when executing the set of instructions, the at least one processor is directed to cause the system to:
obtain one or more target infrared data frames related to a target object, each of the one or more target infrared data frames including compressed infrared data, and
generate one or more raw infrared data frames corresponding to the one or more target infrared data frames based on the compressed infrared data according to operations including:
for each of the one or more target infrared data frames,
determining a compression operation performed on raw infrared data, the compression operation including a first compression operation or a second compression operation; and
generating the raw infrared data frame corresponding to the target infrared data frame by parsing the compressed infrared data based on the compression operation performed on the raw infrared data, the operations further including:
determining a count of pixels with difference values not being set as zeros in residual data between raw infrared data and reference data, wherein the different values in the residual data less than a first preset threshold are set as zeros;
determining whether the count of pixels is larger than a third preset threshold;
in response to a determination that the count of pixels is larger than the third preset threshold, performing the first compression operation on a next raw infrared data frame among the one or more raw infrared data frames; or
in response to a determination that the count of pixels is less than or equal to the third preset threshold, perform the second compression operation on the next raw infrared data frame.

12. The system of claim 11, wherein,
the frame header includes at least one of a frame identifier or a frame size;

the information header includes at least one of a compression type of the compression operation performed on the raw infrared data, a width of the raw infrared data frame, a height of the raw infrared data frame, a size of compressed infrared data frame, a compression algorithm of the compression operation, or a temperature measurement algorithm used for converting the raw infrared data into temperature information; and the data area includes at least one of the compressed infrared data frame or temperature measurement parameters.

13. The system of claim 11, wherein to generate the raw infrared data frame corresponding to the target infrared data frame by parsing the compressed infrared data based on the compression operation performed on the raw infrared data, the at least one processor is directed to cause the system to:

in response to a determination that the compression operation performed on the raw infrared data is the first compression operation, obtain first decompressed infrared data by performing a first decompression operation on the compressed infrared data; and determine a first type of raw infrared data frame based on the first decompressed infrared data.

14. The system of claim 13, wherein the at least one processor is directed to cause the system further to:

determine first type of raw infrared data in the first type of raw infrared data frame as reference data for a next target infrared data frame.

15. The system of claim 13, wherein to generate the raw infrared data frame corresponding to the target infrared data frame by parsing the compressed infrared data based on the compression operation performed on the raw infrared data, the at least one processor is directed to cause the system to:

in response to a determination that the compression operation performed on the raw infrared data is the second compression operation, obtain second decompressed infrared data by performing a second decompression operation on the compressed infrared data;

determine the second decompressed raw infrared data as decompressed residual data between the raw infrared data in the raw infrared data frame and reference data corresponding to a previous target infrared data frame; and determine a second type of raw infrared data frame based on the second decompressed residual data.

16. The system of claim 15, wherein the at least one processor is directed to cause the system further to:

designate the decompressed residual data plus the reference data as updated reference data for a next target infrared data frame.

17. The system of claim 11, wherein to determine the compression operation performed on the raw infrared data, the at least one processor is directed to cause the system further to:

obtain the compression type of the compression operation performed on the raw infrared data from the information header; and determine the compression operation performed on the raw infrared data based on the compression type of the compression operation performed on the raw infrared data.

18. A method for processing infrared data, implemented on a computing device including at least one processor and at least one storage, comprising:

obtaining one or more raw infrared data frames related to a target object, wherein each of the one or more raw infrared data frames includes raw infrared data including raw temperature information and raw grayscale information of the target object; and generating one or more target infrared data frames corresponding to the one or more raw infrared data frames based on the raw infrared data according to operations including:

for each of the one or more raw infrared data frames, determining a compression operation to be performed on the raw infrared data in the raw infrared data frame, the compression operation including a first compression operation or a second compression operation; and determining the target infrared data frame corresponding to the raw infrared data frame by performing the compression operation on the raw infrared data, the operations further including:

determining a count of pixels with difference values not being set as zeros in residual data between raw infrared data and reference data, wherein the different values in the residual data less than a first preset threshold are set as zeros;

determining whether the count of pixels is larger than a third preset threshold;

in response to a determination that the count of pixels is larger than the third preset threshold, performing the first compression operation on a next raw infrared data frame among the one or more raw infrared data frames; or in response to a determination that the count of pixels is less than or equal to the third preset threshold, perform the second compression operation on the next raw infrared data frame.

19. The method of claim 18, wherein the frame header includes at least one of a frame identifier or a frame size;

the information header includes at least one of a compression type of the compression operation performed on the raw infrared data, a width of the raw infrared data frame, a height of the raw infrared data frame, a size of compressed infrared data frame, a compression algorithm of the compression operation, or a temperature measurement algorithm used for converting the raw infrared data into temperature information; and the data area includes at least one of the compressed infrared data or temperature measurement parameters.

* * * * *